United States Patent
Hsieh et al.

(10) Patent No.: US 11,631,661 B2
(45) Date of Patent: Apr. 18, 2023

(54) INTEGRATED CIRCUIT HAVING ANGLED CONDUCTIVE FEATURE

(71) Applicant: TAIWAN SEMICONDUCTOR MANUFACTURING COMPANY, LTD., Hsinchu (TW)

(72) Inventors: Tung-Heng Hsieh, Hsinchu (TW);
Ting-Wei Chiang, Hsinchu (TW);
Chung-Te Lin, Hsinchu (TW);
Hui-Zhong Zhuang, Hsinchu (TW);
Li-Chun Tien, Hsinchu (TW);
Sheng-Hsiung Wang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 164 days.

(21) Appl. No.: 17/317,216

(22) Filed: May 11, 2021

(65) Prior Publication Data

US 2021/0280572 A1    Sep. 9, 2021

Related U.S. Application Data

(60) Continuation of application No. 16/722,324, filed on Dec. 20, 2019, now Pat. No. 11,024,622, which is a
(Continued)

(51) Int. Cl.
*H01L 27/02* (2006.01)
*G06F 30/39* (2020.01)
(Continued)

(52) U.S. Cl.
CPC .......... *H01L 27/0207* (2013.01); *G06F 30/39* (2020.01); *G06F 30/392* (2020.01);
(Continued)

(58) Field of Classification Search
CPC . H01L 27/0207; H01L 23/528; H01L 27/092; G06F 30/39; G06F 30/392; G06F 30/398
See application file for complete search history.

(56) References Cited

U.S. PATENT DOCUMENTS 6,356,320 B1    3/2002    Chung
8,631,379 B2    1/2014    Chen
(Continued)

*Primary Examiner* — Stacy Whitmore
(74) *Attorney, Agent, or Firm* — Hauptman Ham, LLP

(57) ABSTRACT

An integrated circuit includes a first gate electrode structure extending in a first direction and having a first portion and a second portion separated from each other. The integrated circuit further includes a second gate electrode structure extending in the first direction and separated in a second direction from the first gate electrode structure. The integrated circuit further includes a conductive feature. The conductive feature includes a first section electrically connected to the second portion, wherein the first section extends in the second direction. The conductive feature further includes a second section electrically connected to the second gate electrode structure, wherein the second section extends in the second direction. The conductive feature further includes a third section electrically connecting the first section and the second section, wherein the third section extends in a third direction angled with respect to both the first direction and the second direction.

20 Claims, 15 Drawing Sheets

Related U.S. Application Data continuation of application No. 15/233,126, filed on Aug. 10, 2016, now Pat. No. 10,522,527, which is a division of application No. 14/500,528, filed on Sep. 29, 2014, now Pat. No. 9,431,381.

(51) Int. Cl.
    *G06F 30/392*     (2020.01)
    *G06F 30/398*     (2020.01)
    *H01L 23/528*     (2006.01)
    *H01L 27/092*     (2006.01)

(52) U.S. Cl.
    CPC .......... *G06F 30/398* (2020.01); *H01L 23/528* (2013.01); *H01L 27/092* (2013.01)

(56) References Cited

U.S. PATENT DOCUMENTS

| | | |
|---|---|---|
| 8,943,445 B2 | 1/2015 | Chen |
| 9,136,168 B2 | 9/2015 | Liu |
| 9,704,862 B2 | 7/2017 | Park et al. |
| 2009/0224317 A1 | 9/2009 | Becker |
| 2010/0159685 A1 | 6/2010 | Chuang |
| 2011/0115024 A1 | 5/2011 | Lee |
| 2011/0197168 A1 | 8/2011 | Chen |
| 2013/0174106 A1 | 7/2013 | Hsu |
| 2013/0339911 A1 | 12/2013 | Hsu |
| 2014/0101623 A1 | 4/2014 | Chen |
| 2014/0149955 A1 | 5/2014 | Chase |
| 2014/0195997 A1 | 7/2014 | Tseng |
| 2014/0282306 A1 | 9/2014 | Chen |
| 2014/0282332 A1 | 9/2014 | Katoch |
| 2014/0298284 A1 | 10/2014 | Hsu |
| 2015/0001734 A1 | 1/2015 | Liu |
| 2015/0046887 A1 | 2/2015 | Sun |
| 2015/0143315 A1 | 5/2015 | Katoch |
| 2015/0199469 A1 | 7/2015 | Chen |
| 2015/0234974 A1 | 8/2015 | Dechene |
| 2015/0249041 A1 | 9/2015 | Becker |
| 2015/0333002 A1 | 11/2015 | Liu |
| 2016/0005614 A1 | 1/2016 | Liu |
| 2016/0086947 A1 | 3/2016 | Park et al. |
| 2018/0025968 A1 | 1/2018 | Liu et al. |

INTEGRATED CIRCUIT HAVING ANGLED CONDUCTIVE FEATURE

PRIORITY CLAIM

The present application is a continuation of U.S. application Ser. No. 16/722,324, filed Jan. 16, 2020, which is a continuation of U.S. application Ser. No. 15/233,126, filed Aug. 10, 2016, now U.S. Pat. No. 10,522,527, issued Dec. 31, 2019, which is a divisional of U.S. application Ser. No. 14/500,528, filed Sep. 29, 2014, now U.S. Pat. No. 9,431,381, issued Aug. 30, 2016, which are incorporated herein by reference in their entireties.

BACKGROUND

An integrated circuit (IC) is fabricated according to a set of layouts usable to form corresponding masks for selectively forming or removing various layers of features, such as active regions, gate electrodes, various layers of isolation structures, and/or various layers of conductive structures. Many fabrication processes are available to increase the spatial resolution of various layers of features and thus allow layout patterns to have a finer spatial resolution requirement in a corresponding layout. Some approaches usable for increasing the spatial resolution include using one or more fabrication processes such as ultraviolet lithography, extreme ultraviolet lithography, electron-beam lithography, and/or multiple-patterning. However, in many applications, a fabrication process offering a finer spatial resolution often comes with a higher cost, lower yield, and/or longer processing time. Having every layer of features of an IC fabricated by processes offering the same spatial resolution is not always economically feasible.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
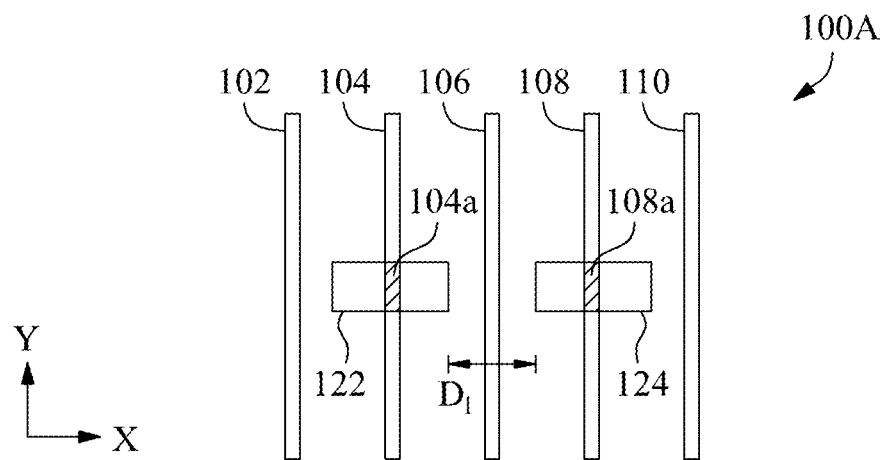
FIG. 1A is a layout diagram of a portion of a circuit in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with one or more embodiments of the present disclosure, a gate electrode layout has a finer spatial resolution than a corresponding gate electrode cutting layout. By merging two gate electrode cutting layout patterns that are not spaced apart in compliance with the spatial resolution requirement of the gate electrode cutting layout and adding a remedial connecting layout pattern to a corresponding conductive layer for reestablishing an electrical connection interrupted as a result of the inclusion of the merged gate electrode cutting layout pattern, the violation of the spatial resolution requirement of the gate electrode cutting layout is resolved. In some embodiments, the system and method disclosed in the present application are applicable to cutting layout usable in conjunction with conductive features other than gate electrodes.

FIGS. 1A-4D are usable to illustrate one or more non-compliance scenarios and corresponding remedial measures. A systematic approach to implement various remedial measures explained in conjunction with FIGS. 1A-4D will be further illustrated in conjunction with the flow chart of FIG. 5. FIG. 6 further depicts a system usable to perform the method of FIG. 5.

FIG. 1A is a layout diagram 100A of a portion of a circuit in accordance with some embodiments. Layout diagram 100A includes a plurality of gate electrode layout patterns 102, 104, 106, 108, and 110 and two gate electrode cutting (CUT) layout patterns 122 and 124. In some embodiments, gate electrode layout patterns 102, 104, 106, 108, and 110 are part of a gate electrode layout, and CUT layout patterns 122 and 124 are part of a CUT layout. Other layout patterns and other layout usable to fabricate the circuit are omitted.

Gate electrode layout patterns 102, 104, 106, 108, and 110 are usable to fabricate gate electrode structures. The gate electrode structures corresponding to gate electrode layout patterns 102, 104, 106, 108, and 110 extend along a first direction Y and have a predetermined spatial resolution along a second direction X. In some embodiments, the gate electrode structures corresponding to gate electrode layout patterns 102, 104, 106, 108, and 110 are fabricated using a multiple patterning technology or other suitable processes offering the predetermined spatial resolution. In some embodiments, the gate electrode structures corresponding to gate electrode layout patterns 102, 104, 106, 108, and 110 are polysilicon structures. In some embodiments, the polysilicon structures corresponding to gate electrode layout patterns 102, 104, 106, 108, and 110 are further replaced by metallic materials to become metallic gate electrodes.

CUT layout patterns 122 and 124 are aligned along the X direction. CUT layout patterns 122 and 124 correspond to carve-out portions (e.g., regions 104a and 108a) of the gate electrode structures fabricated according to gate electrode layout patterns 104 and 108. In some embodiments, the CUT layout is usable in conjunction with one or more processes that do not offer as fine spatial resolution as the one or more processes for fabricating the gate electrode structures. As a result, the CUT layout has a predetermined spatial resolution requirement, and the spatial resolution of the gate electrode structures is finer than the spatial resolution requirement of the CUT layout in FIG. 1A.

In FIG. 1A, a minimum distance $D_1$ between CUT layout patterns 122 and 124 is less than a predetermined threshold distance. Therefore, CUT layout patterns 122 and 124 are too close to be in compliance with the spatial resolution requirement of the CUT layout. In some embodiments, CUT layout patterns 122 and 124 are too close to be implemented using a single mask. Further modification of the CUT layout in order to resolve the non-compliance of CUT layout patterns 122 and 124 will be illustrated in conjunction with one or more of the following Figures.

Figure 1B:
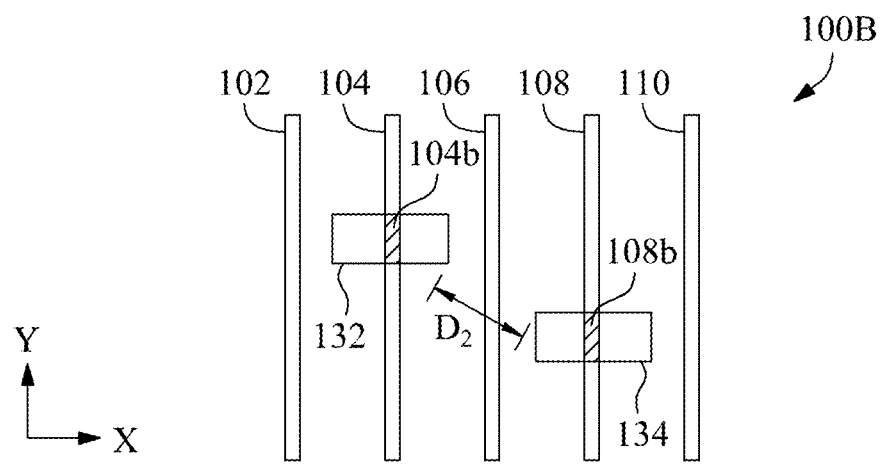
FIG. 1B is a layout diagram of a portion of another circuit in accordance with some embodiments.

FIG. 1B is a layout diagram 100B of a portion of another circuit in accordance with some embodiments. Components in FIG. 1B that are the same or similar to those in FIG. 1A are given the same reference numbers, and detailed description thereof is thus omitted.

Layout diagram 100B includes a plurality of gate electrode layout patterns 102, 104, 106, 108, and 110 and two CUT layout patterns 132 and 134 corresponding to CUT layout patterns 122 and 124 in FIG. 1. In some embodiments, gate electrode layout patterns 102, 104, 106, 108, and 110 are part of a gate electrode layout, and CUT layout patterns 132 and 134 are part of a CUT layout. Other layout patterns and other layout are usable to fabricate the circuit are omitted.

Compared with layout diagram 100A, CUT layout patterns 132 and 134 are not aligned along the X direction, i.e., they correspond to different y-coordinates. CUT layout patterns 132 and 134 correspond to carve-out portions (e.g., regions 104b and 108b) of the gate electrode structures fabricated according to gate electrode layout patterns 104 and 108. In some embodiments, the spatial resolution of the gate electrode structures is finer than the spatial resolution requirement of the CUT layout in FIG. 1B.

In FIG. 1B, a minimum distance $D_2$ between CUT layout patterns 132 and 134 is less than a predetermined threshold distance. Therefore, CUT layout patterns 132 and 134 are too close to be in compliance with the spatial resolution requirement of the CUT layout. Further modification of the CUT layout in order to resolve the non-compliance of CUT layout patterns 132 and 134 will be illustrated in conjunction with one or more of the following Figures.

Figures 2A, 2B:
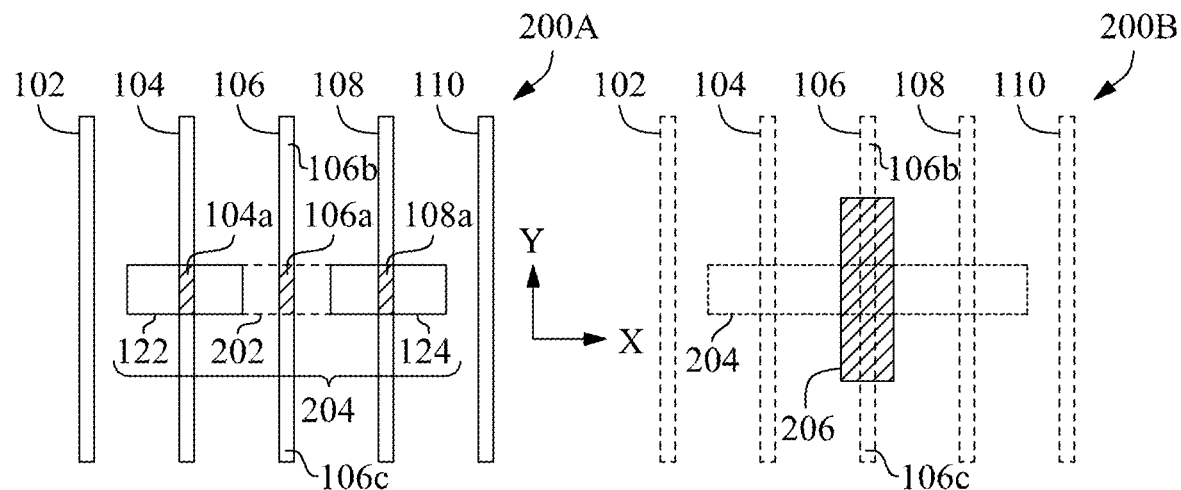
FIGS. 2A-2B are layout diagrams of portions of a circuit in accordance with some embodiments.

FIG. 2A is a layout diagram 200A of a portion of a circuit in accordance with some embodiments. Layout diagram 200A depicts an example approach to modify the CUT layout in order to resolve the non-compliance of CUT layout patterns 122 and 124 in FIG. 1A. Components in FIG. 2A that are the same or similar to those in FIG. 1A are given the same reference numbers, and a detailed description thereof is thus omitted.

In FIG. 2A, a stitching layout pattern 202 is introduced to connect CUT layout patterns 122 and 124 into a merged CUT layout pattern 204. Merged CUT layout pattern 204 is included in the CUT layout in place of CUT layout patterns 122 and 124. Merged CUT layout pattern 204 also makes it possible to avoid separating two layout patterns by a distance $D_1$ that is smaller than the spatial resolution requirement of the CUT layout. Thus, the inclusion of merged CUT layout pattern 204 makes it possible to resolve the non-compliance of CUT layout patterns 122 and 124. Stitching layout pattern 202 has an I shape extending along the direction X. In some embodiments, stitching layout pattern 202 has a shape other than the I shape extending along the direction X.

Stitching layout pattern 202 further corresponds to a carve-out portion (e.g., region 106a) of the gate electrode structure fabricated according to gate electrode layout pattern 106. Carve-out region 106a is thus aligned with carve-out regions 104a and 108a along direction X. The gate electrode structure fabricated according to gate electrode layout pattern 106 is thus divided into two portions (corresponding to regions 106b and 106c) separated by the carve-out portion corresponding to region 106a. However, compared with the original layout as depicted in FIG. 1A, the two portions (corresponding to regions 106b and 106c) of the gate electrode fabricated according to layout pattern 106 are meant to be electrically connected.

FIG. 2B is a layout diagram 200B of a portion of the circuit of FIG. 2A in accordance with some embodiments. Layout diagram 200B depicts an example approach to further modify a conductive layer layout to reestablish the electrical connections of one or more gate electrodes that are interrupted by the inclusion of stitching layout pattern 202. Components in FIG. 2B that are the same or similar to those in FIG. 2A are given the same reference numbers, and detailed description thereof is thus omitted.

Layout diagram 200B depicts that a remedial connecting layout pattern 206 is added to a conductive layer layout usable for fabricating the IC. Remedial connecting layout pattern 206 is usable to fabricate a conductive feature electrically connecting two portions (corresponding to regions 106b and 106c) of the gate electrode structure fabricated according to layout pattern 106. Remedial connecting layout pattern 206 has an I shape extending along the direction Y and partially overlaps the regions 106b and 106c of gate electrode layout pattern 106. In some embodiments, remedial connecting layout pattern 206 has a shape other than the I shape extending along the direction Y.

Figures 2C, 2D:
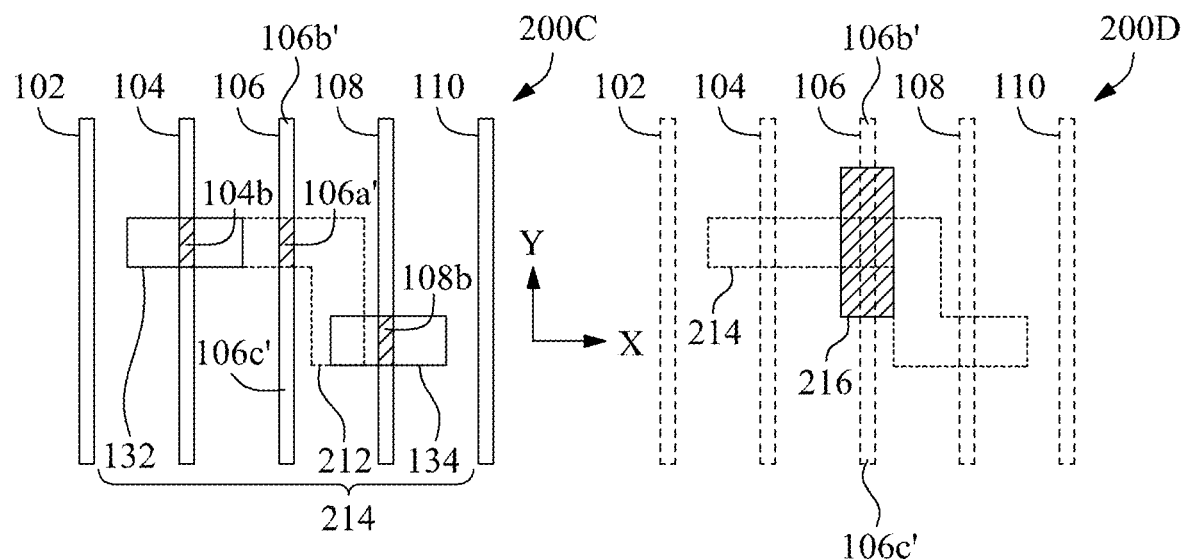
FIGS. 2C-2D are layout diagrams of portions of another circuit in accordance with some embodiments.

FIG. 2C is a layout diagram 200C of a portion of a circuit in accordance with some embodiments. Layout diagram 200C depicts an example approach to modify the CUT layout in order to resolve the non-compliance of CUT layout patterns 132 and 134 in FIG. 1B. Components in FIG. 2C that are the same or similar to those in FIG. 1B are given the same reference numbers, and detailed description thereof is thus omitted.

In FIG. 2C, a stitching layout pattern 212 is introduced to connect CUT layout patterns 132 and 134 into a merged CUT layout pattern 214. Merged CUT layout pattern 214 is included in the CUT layout in place of CUT layout patterns 132 and 134. Merged CUT layout pattern 214 also makes it possible to avoid separating two layout patterns with a distance $D_2$ that is smaller than the spatial resolution requirement of the CUT layout. Thus, the inclusion of merged CUT layout pattern 214 makes it possible to resolve the non-compliance of CUT layout patterns 132 and 134. Stitching layout pattern 212 has an L shape including one leg extending along the direction X and another leg extending along the direction Y. In some embodiments, stitching layout pattern 212 has a shape other than the L shape depicted in FIG. 2C.

Stitching layout pattern 212 further corresponds to a carve-out portion (e.g., region 106a') of the gate electrode structure fabricated according to gate electrode layout pattern 106. Carve-out region 106a' is thus aligned with carve-out region 104b but not carve-out region 108b along direction X. The gate electrode structure fabricated according to gate electrode layout pattern 106 includes two portions (corresponding to regions 106b' and 106c') separated by the carve-out portion corresponding to region 106a'. However, compared with the original layout as depicted in FIG. 1B, the two portions (corresponding to regions 106b' and 106c') of the gate electrode fabricated according to layout pattern 106 are meant to be electrically connected.

FIG. 2D is a layout diagram 200D of a portion of the circuit of FIG. 2C in accordance with some embodiments. Layout diagram 200D depicts an example approach to modify a conductive layer layout to reestablish the electrical connection of one or more gate electrodes that are interrupted by the inclusion of stitching layout pattern 212. Components in FIG. 2D that are the same or similar to those in FIG. 2C are given the same reference numbers, and a detailed description thereof is thus omitted.

Layout diagram 200D depicts that a remedial connecting layout pattern 216 is added to a conductive layer layout usable for fabricating the IC. Remedial connecting layout pattern 216 is usable to fabricate a conductive feature electrically connecting two portions (corresponding to regions 106b' and 106c') of the gate electrode structure fabricated according to layout pattern 106. Remedial connecting layout pattern 216 has an I shape extending along the direction Y and partially overlaps the regions 106b' and 106c' of gate electrode layout pattern 106. In some embodiments, remedial connecting layout pattern 216 has a shape other than the I shape extending along the direction Y.

Figure 3A:
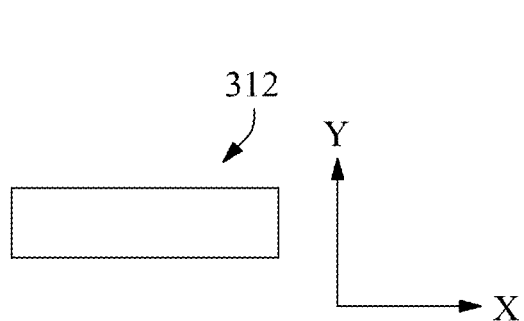
FIGS. 3A-3G are diagrams of example stitching layout patterns in accordance with some embodiments.
Figure 3B:
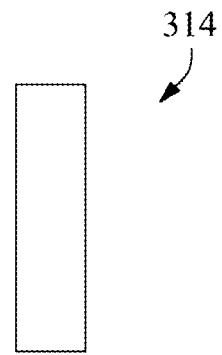
Figure 3C:
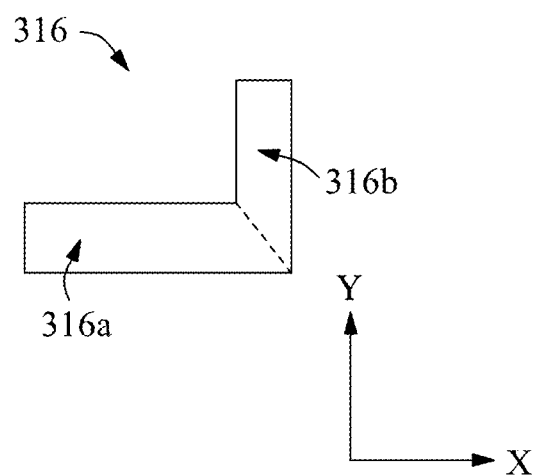
Figure 3D:
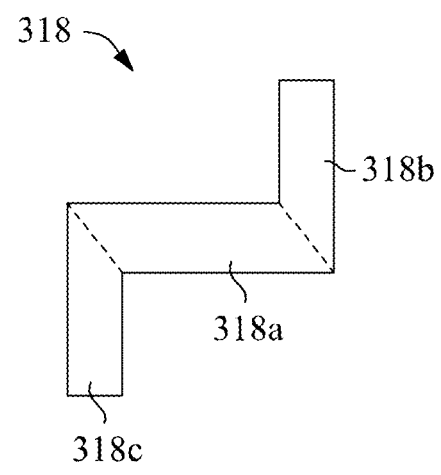

FIGS. 3A-3G are diagrams of example stitching layout patterns in accordance with some embodiments. FIG. 3A depicts a stitching layout pattern 312 that has an I shape extending along the X direction. FIG. 3B depicts a stitching layout pattern 314 that has an I shape extending along the Y direction. FIG. 3C depicts a stitching layout pattern 316 that has an L shape with a first leg 316a extending along the X direction and a second leg 316b extending along the Y direction. FIG. 3D depicts a stitching layout pattern 318 that has a Z shape with a central portion 318a extending along the X direction and a first leg 318b and a second leg 318c at corresponding ends of central portion 318a and extending along the Y direction.

Figure 3E:
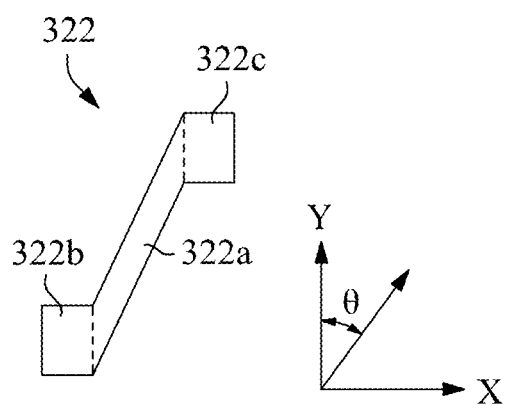
Figure 3F:
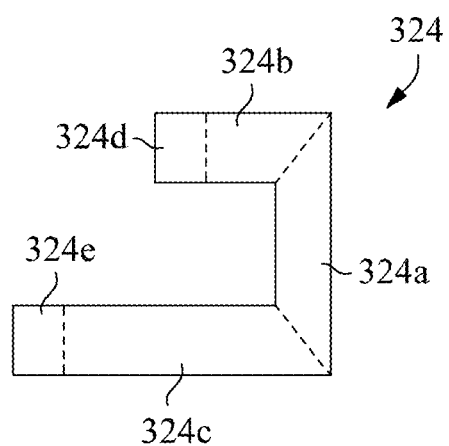

FIG. 3E depicts a stitching layout pattern 322 that has a slanted I shape. Stitching layout pattern 322 includes a central portion 322a extending along a direction having a predetermined angle θ to the Y direction. Stitching layout pattern 322 further includes two contact portions 322b and 322c corresponding to conductive structures for connecting two different gate structures or conductive structures that extend along the Y direction. FIG. 3F depicts a stitching layout pattern 324 that has a J shape with a central portion 324a extending along the Y direction and a first leg 324b and a second leg 324c at corresponding ends of central portion 324a and extending along the X direction. Legs 324b and 324c include contact portions 324d and 324e corresponding to conductive structures for connecting two different gate structures or conductive structures that extend along the Y direction.

Figure 3G:
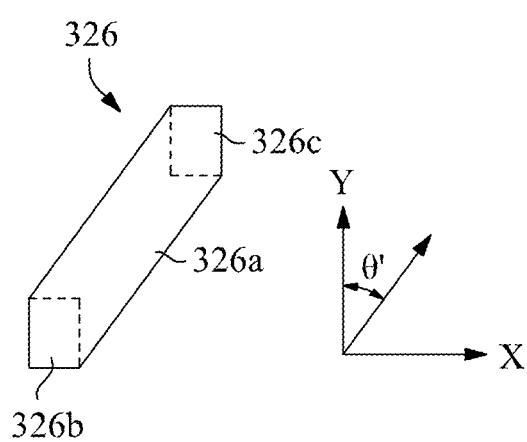

FIG. 3G depicts a stitching layout pattern 326 that has a slanted I shape. Stitching layout pattern 326 includes a central portion 326a extending along a direction having a predetermined angle θ' to the Y direction. Stitching layout pattern 326 further includes two contact portions 326b and 326c corresponding to conductive structures for connecting two different gate structures or conductive structures that extend along the Y direction. Compared with stitching layout pattern 322 in FIG. 3E, central portion 326a and contact portions 326b and 326c are merged as a single convex polygon.

In some embodiments, a stitching layout pattern has a shape of a graphic combination of one or more of stitching layout patterns 312, 314, 316, 318, 322, 324, and 326. In some embodiments, a stitching layout pattern is a mirrored image of stitching layout patterns 312, 314, 316, 318, 322, 324, and 326. In some embodiments, a stitching layout pattern corresponds to stitching layout patterns 312, 314, 316, 318, 322, 324, and 326, rotated by a predetermined angle.

Figures 4A, 4B:
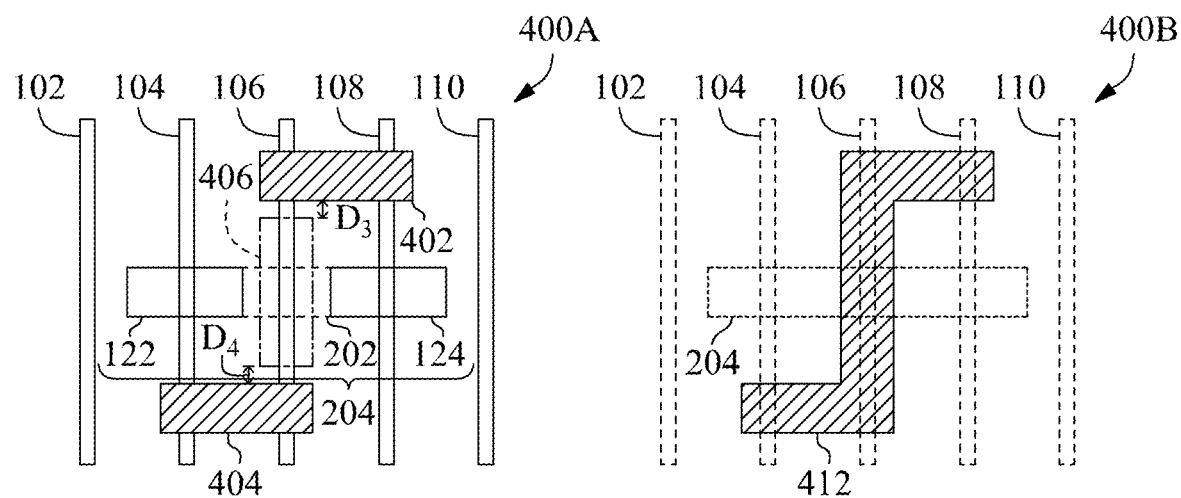
FIGS. 4A-4B are layout diagrams of portions of a circuit in accordance with some embodiments.

FIG. 4A is a layout diagram 400A of a portion of a circuit in accordance with some embodiments. Components in FIG. 4A that are the same or similar to those in FIG. 1A are given the same reference numbers, and detailed description thereof is thus omitted.

Compared with layout diagram 100A, the conductive layer layout where the remedial connecting layout pattern 206 would be included already has layout patterns 402 and 404. Layout pattern 402 corresponds to forming a conductive structure connecting a portion of the gate electrode corresponding to layout pattern 108 and a first portion (corresponding to region 106b in FIG. 2B) of the gate electrode corresponding to layout pattern 106. Layout pattern 404 corresponds to forming another conductive structure connecting a portion of the gate electrode corresponding to layout pattern 104 and a second portion (corresponding to region 106c in FIG. 2B) of the gate electrode corresponding to layout pattern 106. An I shape layout pattern 406 is generated as a tentative remedial connecting layout pattern corresponding to remedial connecting layout pattern 206. However, a minimum distance $D_3$ between tentative remedial connecting layout pattern 406 and layout pattern 402 and a minimum distance $D_4$ between tentative remedial connecting layout pattern 406 and layout pattern 404 are not in compliance with a spatial resolution requirement of the conductive layer layout.

FIG. 4B is a layout diagram 400B of a portion of the circuit of FIG. 4A in accordance with some embodiments. Layout diagram 400B depicts an example approach to further modify the conductive layer layout to resolve the non-compliance of layout patterns of the conductive layer layout as a result of introducing tentative remedial connecting layout pattern 406. Components in FIG. 4B that are the same or similar to those in FIG. 4A are given the same reference numbers, and detailed description thereof is thus omitted. In FIG. 4B, a revised remedial connecting layout pattern 412 is generated by merging tentative remedial connecting pattern 406 and layout patterns 402 and 404. Revised remedial connecting layout pattern 412 makes it possible to avoid gaps corresponding to distance $D_3$ and distance $D_4$, and thus makes it possible to resolve the non-compliance of the spatial resolution requirement of the conductive layer layout.

In the embodiment depicted in FIG. 4B, remedial connecting layout pattern 412 has a Z shape as illustrated in conjunction with FIG. 3D. In some embodiments, remedial connecting layout pattern 412 is replaced with a connecting layout pattern having a slanted I shape as illustrated in conjunction with FIG. 3E or FIG. 3G, or a J shape as illustrated in conjunction with FIG. 3F.

Figures 4C, 4D:
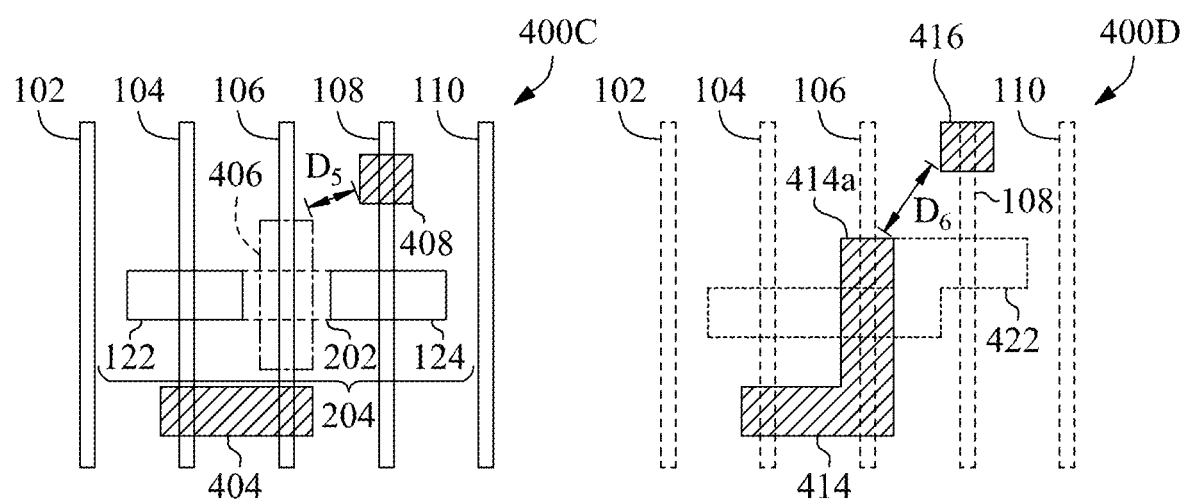
FIGS. 4C-4D are layout diagrams of portions of another circuit in accordance with some embodiments.

FIG. 4C is a layout diagram 400C of a portion of another circuit in accordance with some embodiments. Components in FIG. 4C that are the same or similar to those in FIG. 4A are given the same reference numbers, and detailed description thereof is thus omitted.

Compared with layout diagram 400A, the conductive layer layout where the remedial connecting layout pattern 206 would be included already has layout patterns 408 and 404, and layout pattern 408 does not electrically connect the gate electrode corresponding to layout pattern 108 and the gate electrode corresponding to layout pattern 106. Moreover, a distance $D_5$ between tentative remedial connecting layout pattern 406 and layout pattern 408 is not in compliance with a spatial resolution requirement of the conductive layer layout.

FIG. 4D is a layout diagram 400D of a portion of the circuit of FIG. 4C in accordance with some embodiments. Layout diagram 400D depicts an example approach to further modify the conductive layer layout to resolve the non-compliance of layout patterns of the conductive layer layout as a result of introducing tentative remedial connecting layout pattern 406. Components in FIG. 4D that are the same or similar to those in FIG. 4C are given the same reference numbers, and detailed description thereof is thus omitted.

In FIG. 4D, a revised remedial connecting layout pattern 414 is generated by merging tentative remedial connecting layout pattern 406 and layout pattern 404 in a manner similar to that illustrated in conjunction with FIG. 4B. Layout pattern 408 is shifted further away from the region corresponding to tentative remedial connecting layout pattern 406 to become layout pattern 416. Also, to further adjusting layout pattern 408 and revised remedial connecting layout pattern 414 to be further away from each other, a revised CUT layout pattern 422 is introduced in place of merged CUT layout pattern 204 in order to allow an upper edge 414a of revised remedial connecting layout pattern 414 to be shifted further away from the region corresponding to layout pattern 408.

The resulting conductive layout includes layout patterns 414 and 416 in place of layout patterns 404, 406, and 408, and a distance $D_6$ between layout pattern 414 and layout pattern 416 is in compliance with the spatial resolution requirement of the conductive layout. In some embodiments, if the distance $D_6$ between layout pattern 414 and layout pattern 416 is still not in compliance with the spatial resolution requirement of the conductive layout, a circuit engineer or a layout engineer of the circuit/layout of FIG. 4D is notified, and a manual inspection and revision of the circuit and/or the corresponding layout are performed.

Figure 5:
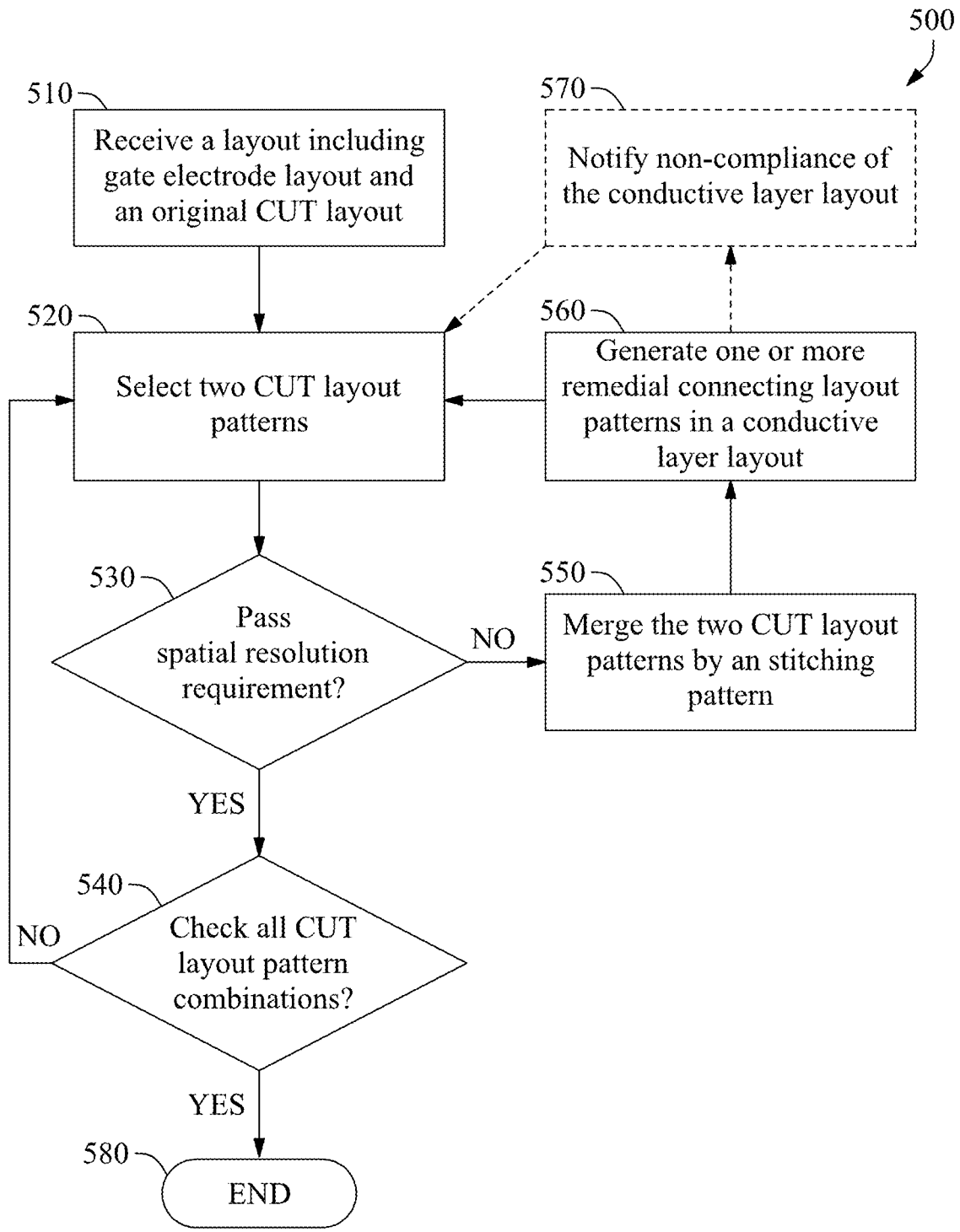
FIG. 5 is a flow chart of a method of processing a gate electrode cutting (CUT) layout in accordance with some embodiments.
Figure 6:
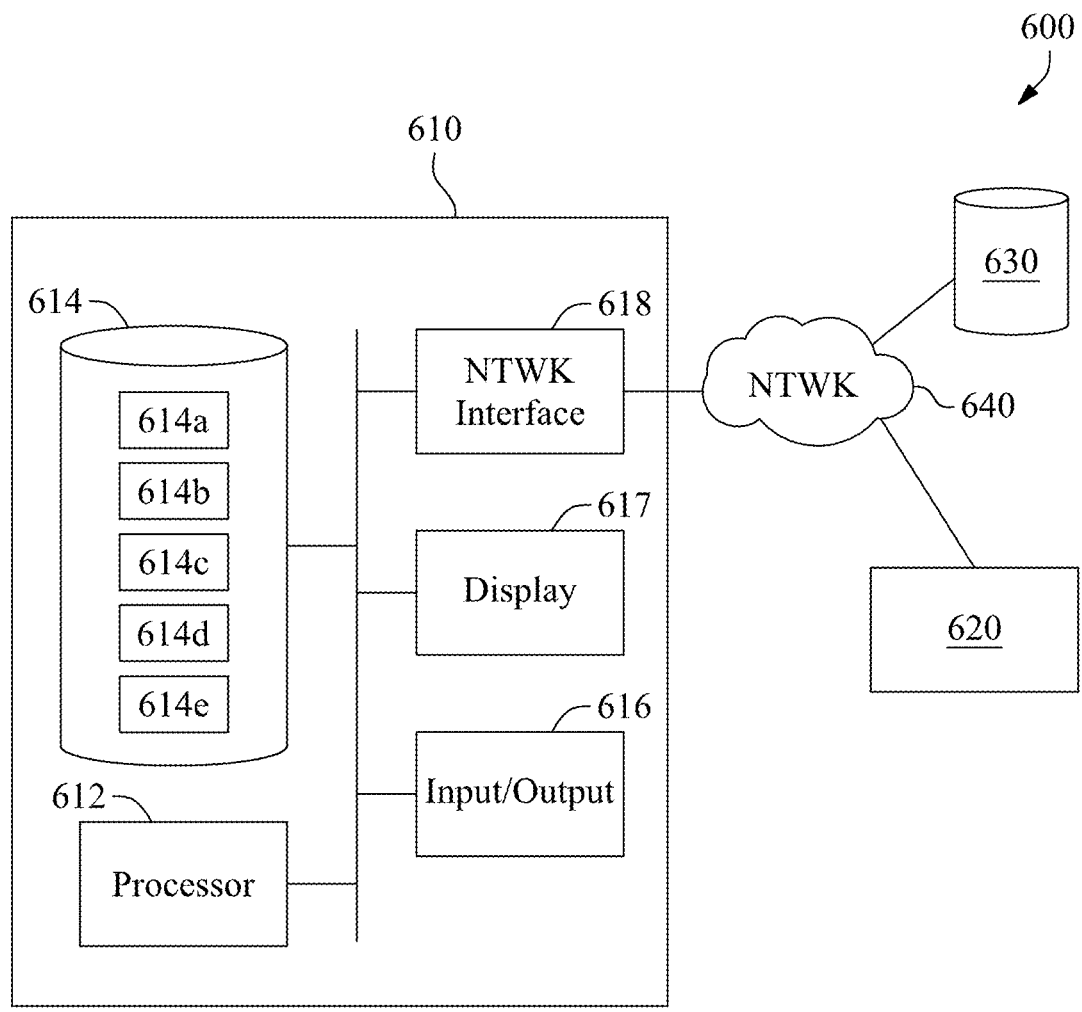
FIG. 6 is a block diagram of an integrated circuit designing system in accordance with some embodiments.

FIG. 5 is a flow chart of a method 500 of processing a gate electrode cutting (CUT) layout in accordance with some embodiments. FIG. 5 will be illustrated in conjunction with the examples depicted in FIGS. 1A-4D. It is understood that additional operations may be performed before, during, and/or after the method 500 depicted in FIG. 5, and that some other processes may only be briefly described herein.

The process begins with operation 510, where a layout design usable for fabricating an integrated circuit (IC) is received. The layout design includes a gate electrode layout usable to fabricate gate electrode structures and an original gate electrode cutting (CUT) layout correspond to various carve-out portions of the gate electrode structures. In some embodiments, the layout design further includes an original conductive layer layout usable to fabricate a layer of conductive features above the gate electrode structures. In some embodiments, the gate electrode layout includes layout patterns such as layout patterns 102, 104, 106, 108, and 110 in FIGS. 1A-2D and 4A-4D. In some embodiments, the original CUT layout includes CUT layout patterns 122 and 124 in FIG. 1A or CUT layout patterns 132 and 134 in FIG. 1B.

The process proceeds to operation 520, where two CUT layout patterns of the original CUT layout are selected for further processing. In one example as depicted in FIG. 1A, CUT layout patterns 122 and 124 are selected to be further processed according to various operations consistent with the method 500. In another example as depicted in FIG. 1B, CUT layout patterns 132 and 134 are selected to be further processed according to various operations consistent with the method 500.

The process proceeds to operation 530 to determine if the two selected CUT layout patterns are in compliance with a predetermined spatial resolution requirement of the CUT layout. In some embodiments, the predetermined spatial resolution requirement includes a predetermined threshold distance. Thus, the two selected CUT layout patterns are determined to be in compliance with the predetermined spatial resolution requirement if a distance between the two selected CUT layout patterns is equal to or greater than the predetermined threshold distance. In some embodiments, if the distance between the two selected CUT layout patterns is less than the predetermined threshold distance, the two selected CUT layout patterns are determined to be not in compliance with the predetermined spatial resolution requirement. For example, in some embodiments, operation 520 includes checking if a distance $D_1$ between CUT layout patterns 122 and 124 is less than the predetermined threshold distance. In some embodiments, operation 520 includes checking if a distance $D_2$ between CUT layout patterns 132 and 134 is less than the predetermined threshold distance.

In operation 530, the process is further branched into two different paths. If it is determined in operation 530 that the selected CUT layout patterns are in compliance with the spatial resolution requirement of the CUT layout, the process proceeds to operation 540 to determine if all CUT layout patterns have been checked for their compliance with the spatial resolution requirement of the CUT layout. If it is determined in operation 530 that the CUT layout patterns is not in compliance with the spatial resolution requirement of the CUT layout, the process proceeds to operation 550 for further processes.

In operation 550, a merged CUT layout pattern is generated based on the selected CUT layout patterns and a stitching layout pattern connecting the selected CUT layout patterns. Based on the merged CUT layout pattern, a modified CUT layout is generated by replacing the selected CUT layout patterns with the merged CUT layout pattern. In one example as depicted in FIG. 2A, a merged CUT layout pattern 204 is generated by connecting CUT layout patterns 122 and 124 with stitching layout pattern 202. In another example as depicted in FIG. 2C, a merged CUT layout pattern 214 is generated by connecting CUT layout patterns 132 and 134 with stitching layout pattern 212.

In some embodiments, as illustrated in conjunction with FIG. 3A-3G, the stitching layout pattern usable in operation 550 has a shape including an I shape, such as stitching layout patterns 312 and 314; an L shape, such as stitching layout pattern 316; a Z shape, such as stitching layout pattern 318; an slanted I shape, such as stitching layout patterns 322 and/or 326; or a J shape, such as stitching layout pattern 324.

After operation 550, the process proceeds to operation 560, where a remedial connecting layout pattern is added to the conductive layer layout. The remedial connecting layout pattern corresponds to fabricating a conductive feature electrically connecting two portions of the gate electrode structure that are separated by the carve-out portion defined based on the stitching layout pattern. In one example as depicted in FIG. 2B, remedial connecting layout pattern 206 is added for electrically connecting portions of the gate electrode structure corresponding to regions 106b and 106c. In another example as depicted in FIG. 2D, remedial connecting layout pattern 216 is added for electrically connecting portions of the gate electrode structure corresponding to regions 106b' and 106c'.

In some embodiments, after generating the remedial connecting layout pattern, operation 560 further includes checking if the remedial connecting layout pattern and other layout pattern of the conductive layer layout are in compliance with a predetermined spatial resolution requirement of the conductive layer layout. In some embodiments, if the inclusion of the remedial connecting layout pattern would render the conductive layer layout non-compliance with the spatial resolution requirement of the conductive layer layout, the process proceeds to operation 570 to notify a circuit designer and/or a layout designer the non-compliance of the remedial connecting layout pattern.

In some embodiments, operation 560 further includes adjusting layout patterns of the conductive layer layout to resolve the non-compliance of the predetermined spatial resolution requirement of the conductive layer layout. In some embodiments, an original conductive layout pattern and the remedial connecting layout pattern are merged to become a modified remedial connecting layout pattern in place of the conductive layout pattern, if electrically connecting the conductive features corresponding to the remedial connecting layout pattern and the original conductive layout pattern is consistent with a circuit schematic of the IC. For example as depicted in FIG. 4B, a modified remedial connecting layout pattern 412 is generated by merging the remedial connecting layout pattern 406 and ordinal conductive layout patterns 402 and 404. For another example as depicted in FIG. 4D, a modified remedial connecting layout pattern 414 is generated by merging the remedial connecting layout pattern 406 and ordinal conductive layout pattern 404.

In some embodiments, an original conductive layout pattern and the remedial connecting layout pattern are adjusted to be further away from each other, if electrically connecting the conductive features corresponding to the remedial connecting layout pattern and the original conductive layout pattern is inconsistent with the circuit schematic of the IC.

In one example as depicted in FIG. 4D, conductive layout pattern 408 is shifted further away from the region corresponding to remedial connecting layout pattern 406. Also, as depicted in FIG. 4D, modified remedial connecting layout pattern 414 is shaped to be further away from the region corresponding to conductive layout pattern 408. In some embodiments, in order to facilitate the adjustment of the shape of modified remedial connecting layout pattern 414, a shape of the merged CUT layout pattern 204 is further adjusted to become adjusted merged CUT layout pattern 422, which is further away from a region corresponding to the conductive layout pattern 408.

In some embodiments, if the additional adjustment measures as illustrated in conjunction with FIGS. 4B and 4D still fail to make the modified conductive layer layout to be in compliance with the spatial resolution requirement thereof, the process proceeds to operation 570 to notify a circuit designer and/or a layout designer the non-compliance of the remedial connecting layout pattern.

In operation 570, in some embodiments, after the circuit designer and/or the layout designer has been notified about the non-compliance of the remedial connecting layout pattern, the process stops and the circuit designer and/or the layout designer will manually revise the circuit schematic or the layout of the IC. In some embodiments, after the circuit designer and/or the layout designer has been notified about the non-compliance of the remedial connecting layout pattern, the process proceeds to operation 520 to check other CUT layout patterns, and the circuit designer and/or the layout designer will manually revise the circuit schematic or the layout of the IC after all CUT layout patterns have been processed according to operations 520, 530, and/or 540.

Moreover, in operation 540, the process determines if all CUT layout patterns have been checked for their compliance with the spatial resolution requirement of the CUT layout. If it is determined in operation 540 that all CUT layout patterns has been checked, the process stops at block 580. If it is determined in operation 540 that one or more CUT layout patterns has not been checked, the process proceeds to operation 520. In some embodiments, operations 520, 530, 550, and 560 are thus performed repetitively on all CUT layout patterns of the CUT layout.

FIG. 6 is a block diagram of an integrated circuit (IC) designing system 600 in accordance with some embodiments. IC designing system 600 includes a first computer system 610, a second computer system 620, a networked storage device 630, and a network 640 connecting the first computer system 610, the second computer system 620, and the networked storage device 630. In some embodiments, one or more of the second computer system 620, the storage device 630, and the network 640 are omitted.

The first computer system 610 includes a hardware processor 612 communicatively coupled with a non-transitory, computer readable storage medium 614 encoded with, i.e., storing, a set of instructions 614a, a circuit schematic 614b, a circuit layout 614c, a modified layout 614d, or any intermediate data 614e for executing the set of instructions 614a. The processing unit 612 is electrically and communicatively coupled with the computer readable storage medium 614. The processing unit 612 is configured to execute the set of instructions 614a encoded in the computer readable storage medium 614 in order to cause the computer 610 to be usable as an IC designing system, including functionalities such as checking CUT layout patterns, merging CUT layout patterns, or generating remedial connecting layout patterns consistent with the embodiments of FIGS. 1A-5.

In some embodiments, the set of instructions 614a, the circuit schematic 614b, the circuit layout 614c, the modified layout 614d, or the intermediate data 614e are stored in a non-transitory storage medium other than storage medium 614. In some embodiments, some or all of the set of instructions 614a, the circuit schematic 614b, the circuit layout 614c, the modified layout 614d, or the intermediate data 614e are stored in a non-transitory storage medium in networked storage device 630 or second computer system 620. In such case, some or all of the set of instructions 614a, the circuit schematic 614b, the circuit layout 614c, the modified layout 614d, or the intermediate data 614e stored outside computer 610 is accessible by the processing unit 612 through the network 640.

In some embodiments, the processor 612 is a central processing unit (CPU), a multi-processor, a distributed processing system, an application specific integrated circuit (ASIC), and/or a suitable processing unit.

In some embodiments, the computer readable storage medium 614 is an electronic, magnetic, optical, electromagnetic, infrared, and/or a semiconductor system (or apparatus or device). For example, the computer readable storage medium 614 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 614 includes a compact disk-read only memory (CD-ROM), a compact disk-read/write (CD-R/W), and/or a digital video disc (DVD).

The computer system 610 further includes, in at least some embodiments, an input/output interface 616 and a display unit 617. The input/output interface 616 is coupled to the processor 612 and allows the circuit designer to manipulate the first computer system 610. In at least some embodiments, the display unit 617 displays the status of executing the set of instructions 614a and, in at least some embodiments, provides a Graphical User Interface (GUI). In at least some embodiments, the display unit 617 displays the status of executing the set of instructions 614a in a real time manner. In at least some embodiments, the input/output interface 616 and the display 617 allow an operator to operate the computer system 610 in an interactive manner.

In at least some embodiments, the computer system 610 also includes a network interface 618 coupled to the processor 612. The network interface 618 allows the computer system 610 to communicate with the network 640, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In some embodiments, one or more of the features illustrated above in conjunction with FIGS. 1A-6 are usable in the examples illustrated in conjunction with FIGS. 7-14.

Figure 7:
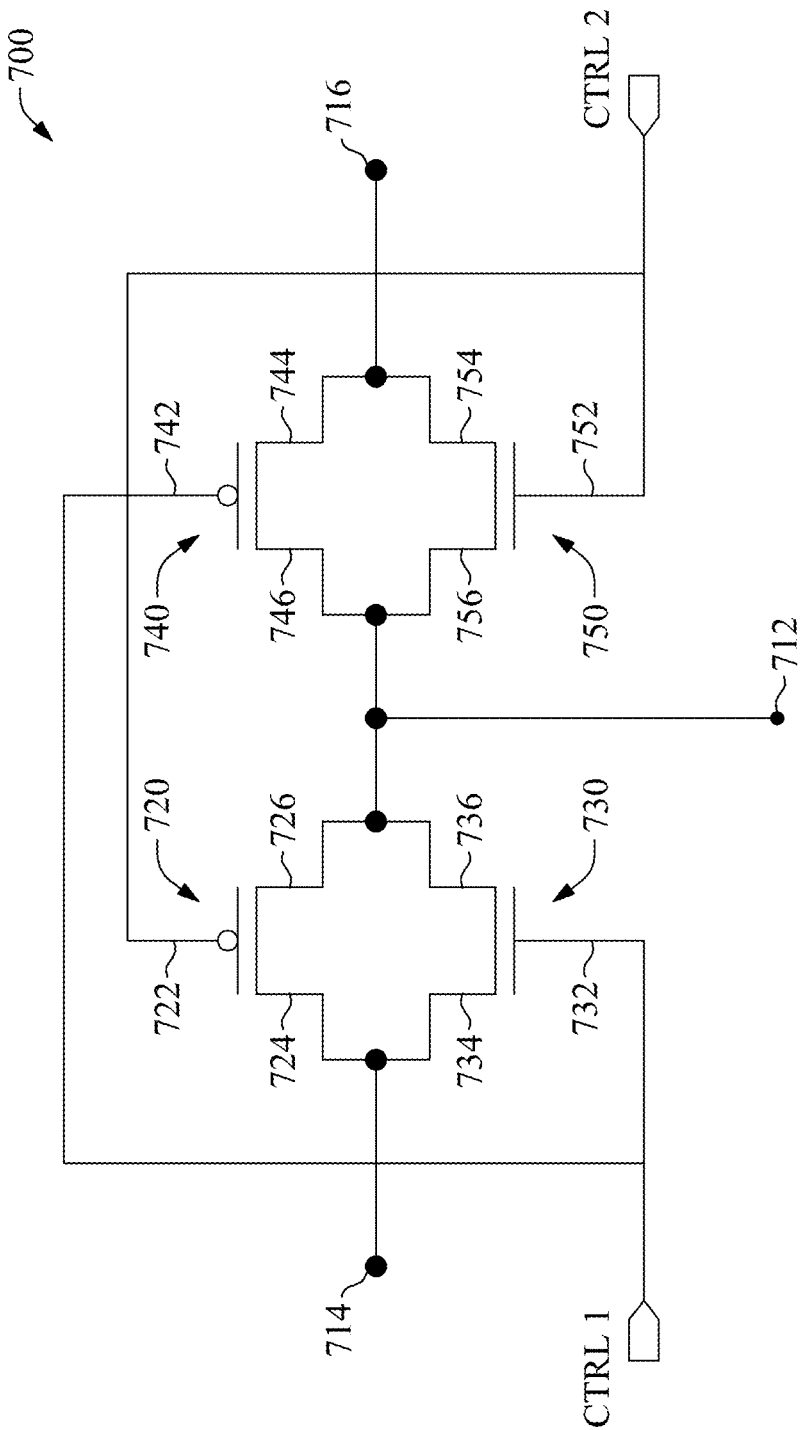
FIG. 7 is a schematic diagram of a switching circuit in accordance with some embodiments.

FIG. 7 is a schematic diagram of a switching circuit 700 in accordance with some embodiments. Switching circuit 700 includes a first node 712, a second node 714, a third node 716, a first P-type transistor 720, a first N-type transistor 730, a second P-type transistor 740, and a second N-type transistor 750. First P-type transistor 720 and first N-type transistor 730 form a first transmission gate between nodes 712 and 714. The first transmission gate is configured to electrically couple nodes 712 and 714 if control signal CTRL1 is logically high and control signal CTRL2 is logically low. Second P-type transistor 740 and second N-type transistor 750 form a second transmission gate between nodes 712 and 716. The second transmission gate is configured to electrically couple nodes 712 and 716 if control signal CTRL2 is logically high and control signal CTRL1 is logically low.

First P-type transistor 720 includes a gate 722, a first source or drain (also referred to as "source/drain" or "S/D") terminal 724, and a second S/D terminal 726. Gate 722 is configured to receive control signal CTRL2. First S/D terminal 724 is electrically coupled with node 714. Second S/D terminal 726 is electrically coupled with node 712.

First N-type transistor 730 includes a gate 732, a first S/D terminal 734, and a second S/D terminal 736. Gate 732 is configured to receive control signal CTRL1. First S/D terminal 734 is electrically coupled with node 714 and the first S/D terminal 724 of transistor 720. Second S/D terminal 736 is electrically coupled with node 712 and the second S/D terminal 726 of transistor 720.

Second P-type transistor 740 includes a gate 742, a first S/D terminal 744, and a second S/D terminal 746. Gate 742 is configured to receive control signal CTRL1. First S/D terminal 744 is electrically coupled with node 716. Second S/D terminal 726 is electrically coupled with node 712 and the second S/D terminal 726 of transistor 720.

Second N-type transistor 750 includes a gate 752, a first S/D terminal 754, and a second S/D terminal 756. Gate 752 is configured to receive control signal CTRL2. First S/D terminal 754 is electrically coupled with node 716 and the first S/D terminal 744 of transistor 740. Second S/D terminal 756 is electrically coupled with node 712 and the second S/D terminal 746 of transistor 740.

Figure 8:
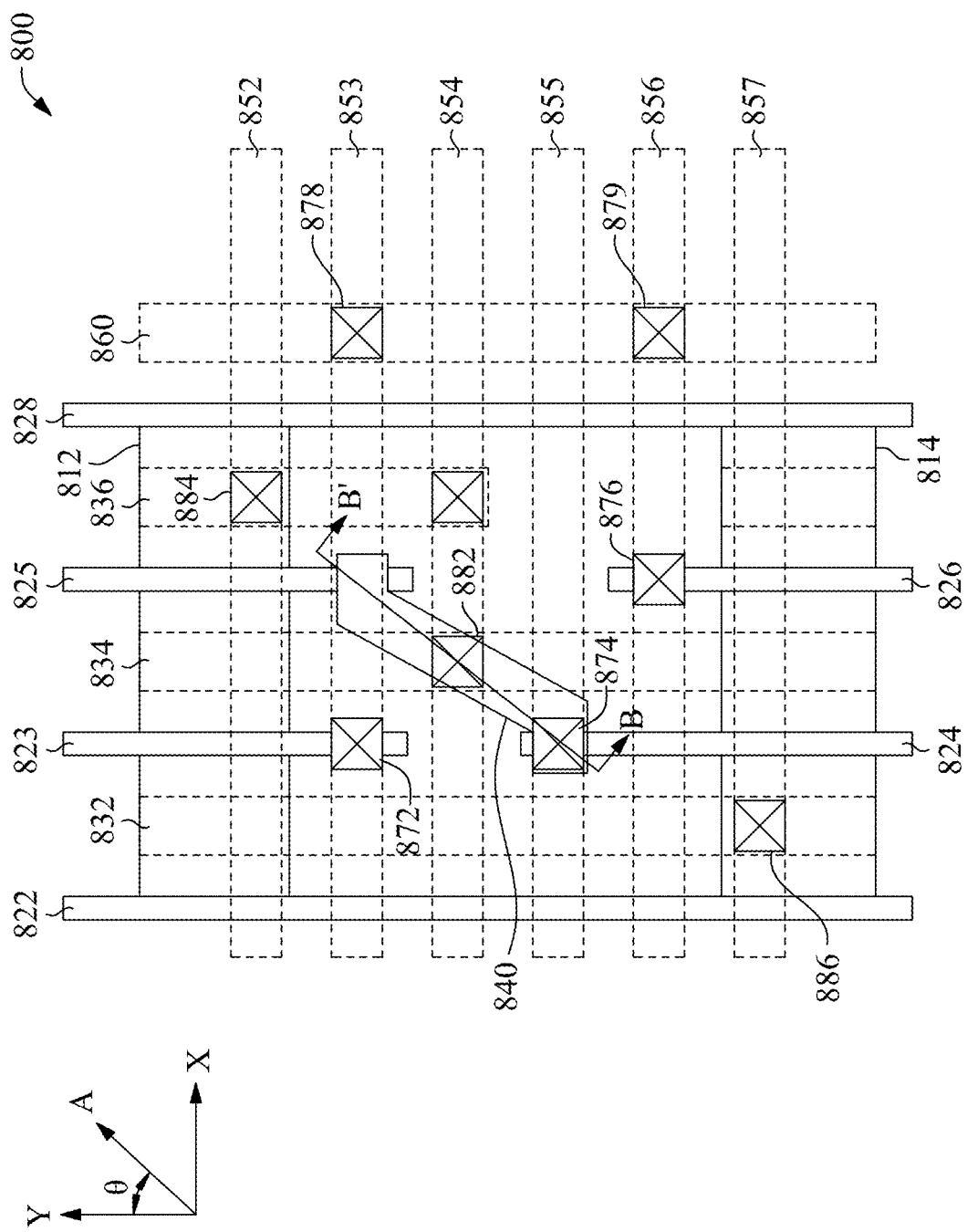
FIG. 8 is a layout diagram of a portion of an example layout design of the switching circuit of FIG. 7 in accordance with some embodiments.

FIG. 8 is a layout diagram of a portion of an example layout design 800 of the switching circuit 700 of FIG. 7 in accordance with some embodiments. Layout design 800 includes a first oxide definition (OD) layout pattern 812; a second OD layout pattern 814; a set of layout patterns 822, 823, 824, 825, 826, and 828 extending along a direction Y for forming corresponding conductive features in a first conductive layer; a set of layout patterns 832, 834, and 836 extending along the direction Y for forming corresponding conductive features in a second conductive layer; a layout pattern 840 extending along a direction A for forming a corresponding conductive feature in a third conductive layer between the first conductive layer and the second conductive layer; and a set of layout patterns 852-857 extending along a direction X for forming corresponding conductive features in a fourth conductive layer over the first, second, and third conductive layers. Layout design 800 also includes a layout pattern 860 corresponding to forming a conductive feature extending along direction Y.

The conductive feature fabricated according to layout pattern 823 is usable as the gate of first P-type transistor 720 in FIG. 7. The conductive feature fabricated according to layout pattern 824 is usable as the gate of first N-type transistor 730. The conductive feature fabricated according to layout pattern 825 is usable as the gate of second P-type transistor 740. The conductive feature fabricated according to layout pattern 826 is usable as the gate of second N-type transistor 750.

The conductive feature fabricated according to layout pattern 832 and the OD region formed according to layout pattern 812 are usable to form the S/D terminal 724 of transistor 720. The conductive feature fabricated according to layout pattern 832 and the OD region formed according to layout pattern 814 are usable to form the S/D terminal 734 of transistor 730. The conductive feature fabricated according to layout pattern 834 and the OD region formed according to layout pattern 812 are usable to form the S/D terminal 726 of transistor 720 and the S/D terminal 746 of transistor 740. The conductive feature fabricated according to layout pattern 834 and the OD region formed according to layout pattern 814 are usable to form the S/D terminal 736 of transistor 730 and the S/D terminal 756 of transistor 750. The conductive feature fabricated according to layout pattern 836 and the OD region formed according to layout pattern 812 are usable to form the S/D terminal 744 of transistor 740. The conductive feature fabricated according to layout pattern 836 and the OD region formed according to layout pattern 814 are usable to form the S/D terminal 754 of transistor 750.

The conductive feature formed according to layout pattern 840 electrically connects gates fabricated according to layout patterns 825 and 824. Therefore, conductive feature formed according to layout pattern 840 corresponds to the signal path configured to receive control signal CTRL1 in FIG. 7. Layout pattern 840 extends along the direction A, and direction A and direction Y have an angle θ ranging from 20 degrees to 70 degrees. In some embodiments, layout pattern 840 corresponds to layout pattern 322 in FIG. 3E. In some embodiments, layout pattern 840 is replaced by a layout pattern corresponding to layout pattern 324 in FIG. 3F. In some embodiments, layout pattern 840 is replaced by a layout pattern corresponding to layout pattern 326 in FIG. 3G.

Layout design 800 further includes via layout patterns 872, 874, 876, 878, and 879 and 882, 884, and 886 corresponding to one or more of via plug layers. The via plugs fabricated based on via layout patterns 872, 874, 876, 878, and 879 and 882, 884, and 886 and the conductive features fabricated based on layout patterns 832-836, 840, and 852-856 together connected the transistor fabricated according to layout patterns 812, 814, and 823-826 to for a circuit as depicted in FIG. 7.

Layout pattern 872 is usable to form a via plug connecting features corresponding to layout patterns 823 and 853. Layout pattern 874 is usable to form a via plug connecting features corresponding to layout patterns 840 and 885. Layout pattern 876 is usable to form a via plug connecting features corresponding to layout patterns 826 and 856. Layout pattern 878 is usable to form a via plug connecting features corresponding to layout patterns 860 and 853. Layout pattern 879 is usable to form a via plug connecting features corresponding to layout patterns 860 and 856.

Layout pattern 882 is usable to form a via plug connecting features corresponding to layout patterns 834 and 854. Layout pattern 884 is usable to form a via plug connecting features corresponding to layout patterns 836 and 852. Layout pattern 886 is usable to form a via plug connecting features corresponding to layout patterns 832 and 857.

Figure 9:
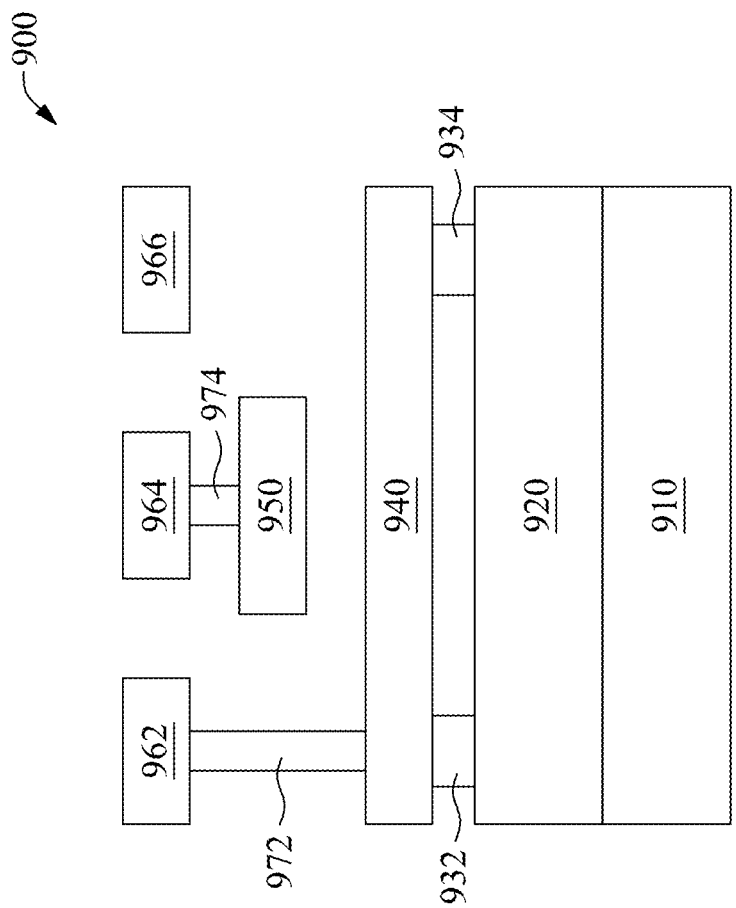
FIG. 9 is a cross-sectional view of a portion of a resulting switching circuit fabricated based the layout design of FIG. 8 in accordance with some embodiments.

FIG. 9 is a cross-sectional view of a portion of a resulting switching circuit 900 fabricated based the layout design of FIG. 8, taken along reference line B-B', in accordance with some embodiments. Switching circuit 900 includes a substrate 910, an insulation layer 920, a polysilicon structure 932 fabricated according to layout pattern 824, a polysilicon structure 934 fabricated according to layout pattern 825, a conductive structure 940 fabricated according to layout pattern 840, a conductive structure 950 fabricated according to layout pattern 834, and conductive features 962, 964, and 966 fabricated according to layout patterns 855, 854, and 853. Switching circuit 900 further includes a via plug 972 fabricated according to layout patterns 874 and connecting conductive features 940 and 962; and a via plug 974 fabricated according to layout patterns 882 and connecting conductive features 950 and 964.

In some embodiments, the conductive features 962, 964, and 966 and other features (not shown) disposed above the conductive features 962, 964, and 966 are fabricated by a back-end-of-line (BEOL) process, and any feature below conductive features 962, 964, and 966 are fabricated by either a front-end-of-line (FEOL) process or a middle-end-of-line (MEOL) process.

In some embodiments, the first conductive layer corresponds to a polysilicon layer or a layer of metal gate structures. In some embodiments, the second conductive layer corresponds to a metal layer over OD regions, which is sometimes referred to as a MD layer. In some embodiments, the third conductive layer corresponds to a metal layer over polysilicon or gate structures, which is sometimes referred to as a MP layer. In some embodiments, the fourth conductive layer corresponds to a lowest metal layer fabricated by the BEOL process, which is sometimes referred to as a M1 layer.

Figure 10:
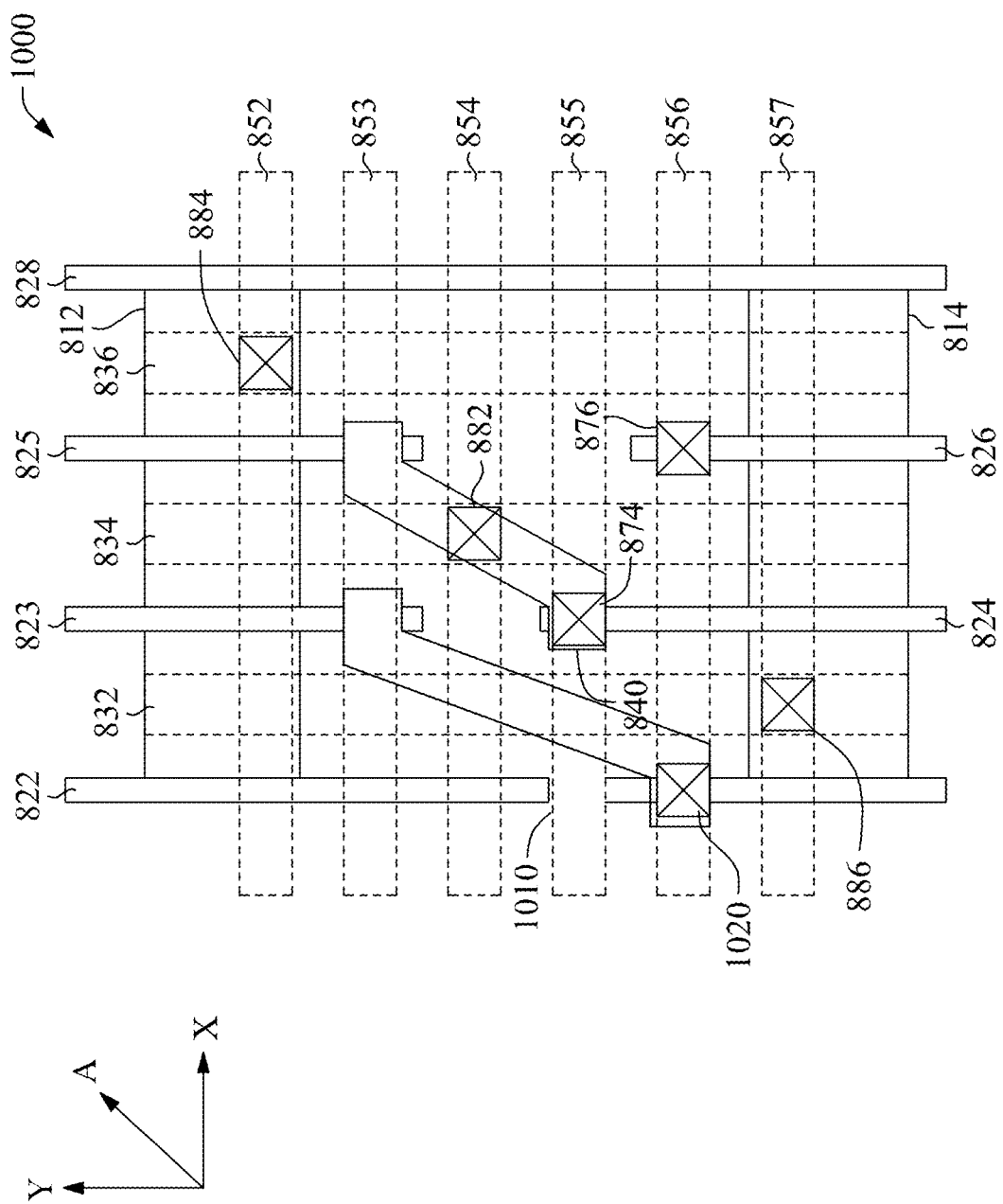
FIGS. 10-14 are layout diagrams of portions of another example layout designs of the switching circuit of FIG. 7 in accordance with some embodiments.

FIG. 10 is a layout diagram of a portion of another example layout design 1000 of the switching circuit of FIG. 7 in accordance with some embodiments. Components in FIG. 10 that are the same or similar to those in FIG. 8 are given the same reference numbers, and detailed description thereof is this omitted.

Compared with layout design 800, layout design 1000 does not have layout patterns 860 878, and 879. Instead, layout design 1000 includes a layout pattern 1010 extending along direction A for forming a conductive layer at the third conductive layer and electrically connecting the gates corresponding to layout patterns 823 and 826 through conductive feature fabricated according to layout pattern 822 and 856. Layout design 1000 also includes a via layout pattern 1020 for forming a via plug connecting conductive features corresponding to layout patterns 822 and 856.

Figure 11:
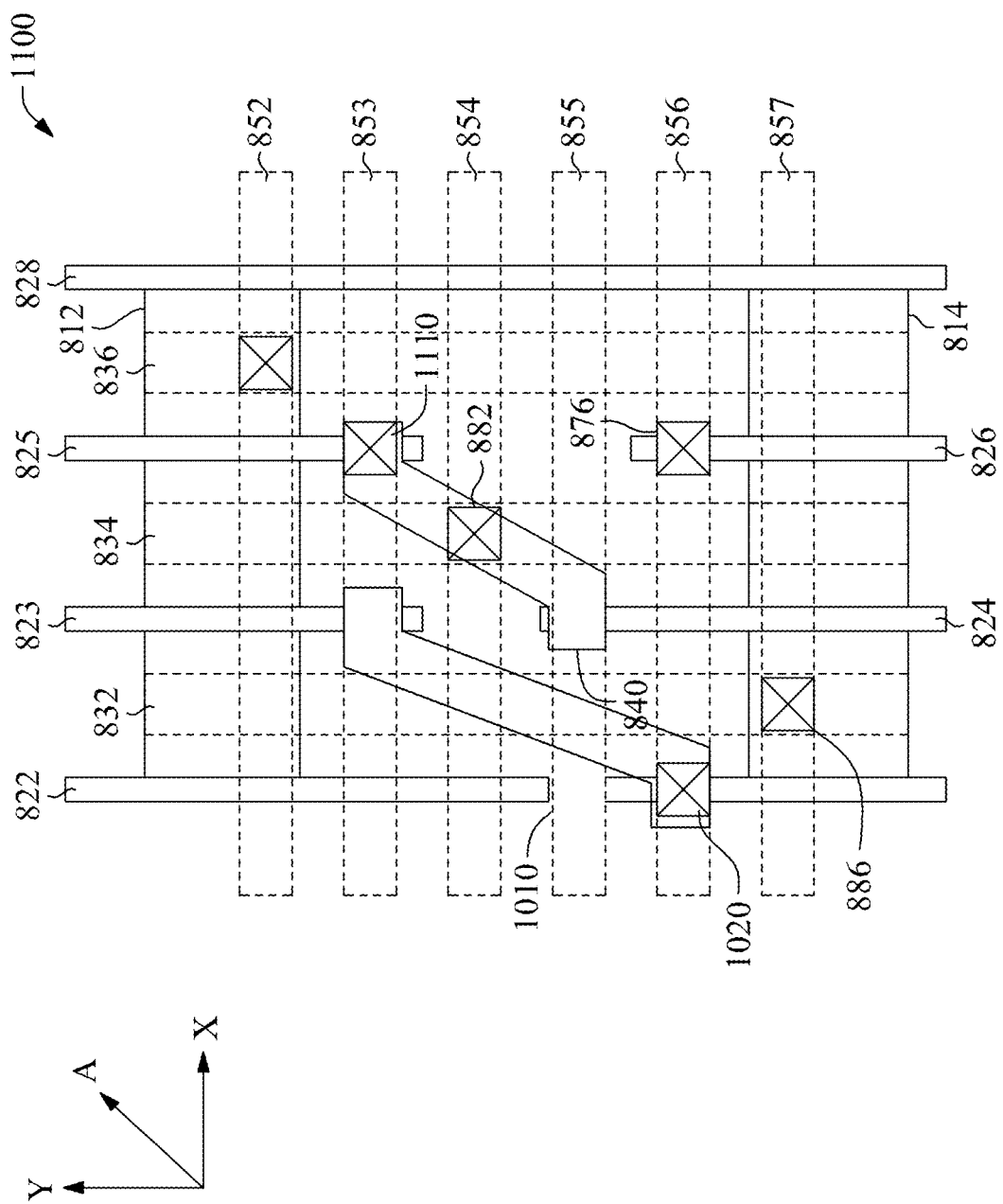

FIG. 11 is a layout diagram of a portion of another example layout design 1100 of the switching circuit of FIG. 7 in accordance with some embodiments. Components in FIG. 11 that are the same or similar to those in FIG. 10 are given the same reference numbers, and detailed description thereof is this omitted.

Compared with layout design 1000, layout design 1100 does not have layout pattern 874. Instead, layout design 1100 includes a via layout pattern 1110 for forming a via plug connecting conductive features corresponding to layout patterns 842 and 853.

Figure 12:
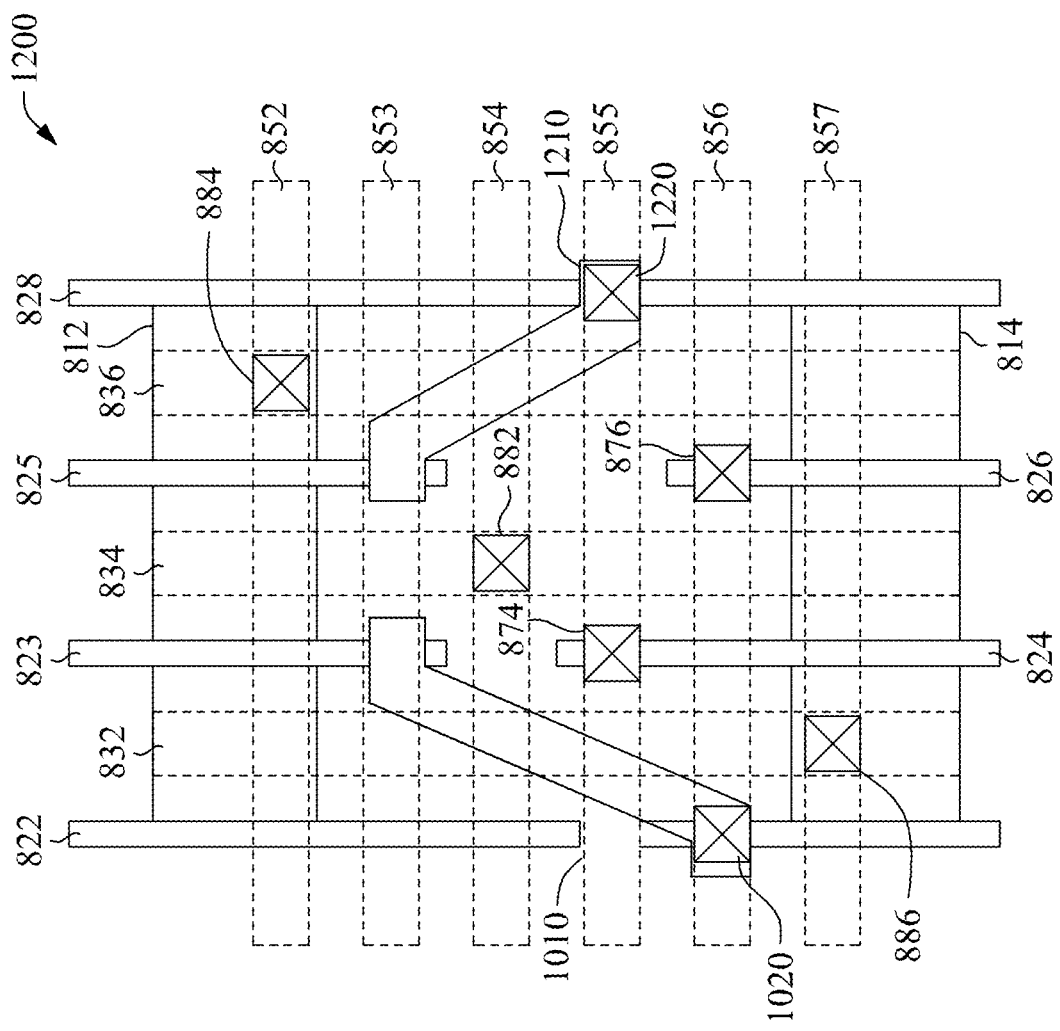
Figure 12:
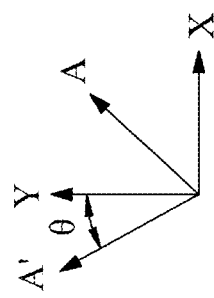

FIG. 12 is a layout diagram of a portion of another example layout design 1200 of the switching circuit of FIG. 7 in accordance with some embodiments. Components in FIG. 12 that are the same or similar to those in FIG. 10 are given the same reference numbers, and detailed description thereof is this omitted.

Compared with layout design 1000, layout design 1200 does not have layout pattern 840. Instead, layout design 1100 includes a layout pattern 1210 extending along a direction A'. Direction A' and the direction Y have an angle θ' ranging from 20 degrees to 70 degrees. Layout pattern 1210 is usable for fabricating a conductive feature in the third conductive layer to electrically connect conductive features corresponding to layout patterns 825 and 828. Layout design 1200 further includes a via layout pattern 1220 for forming a via plug connecting conductive features corresponding to layout patterns 1210 and 855.

Figure 13:
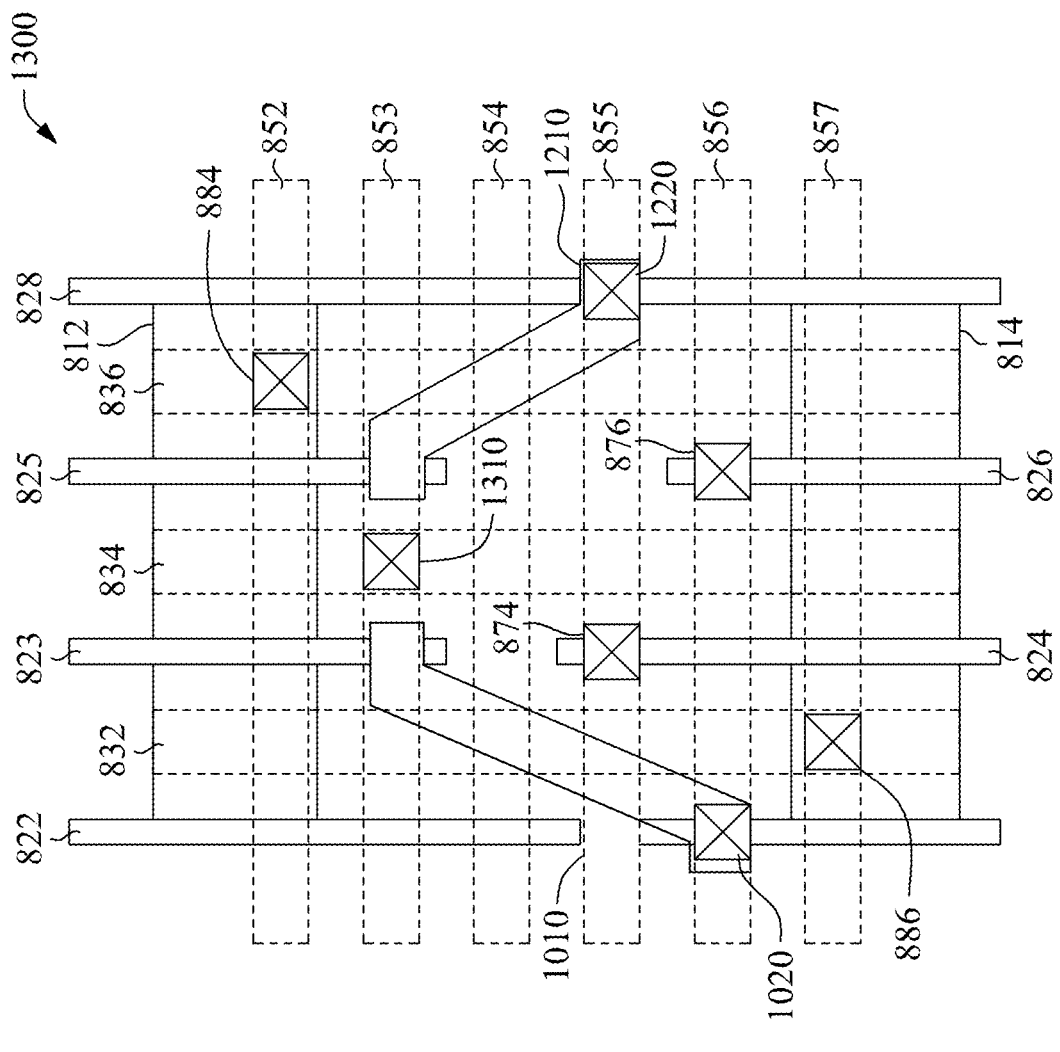

FIG. 13 is a layout diagram of a portion of another example layout design 1300 of the switching circuit of FIG. 7 in accordance with some embodiments. Components in FIG. 13 that are the same or similar to those in FIG. 12 are given the same reference numbers, and detailed description thereof is this omitted.

Compared with layout design 1200, layout design 1300 does not have layout pattern 882. Instead, layout design 1300 includes a via layout pattern 1310 for forming a via plug connecting conductive features corresponding to layout patterns 834 and 853.

Figure 14:
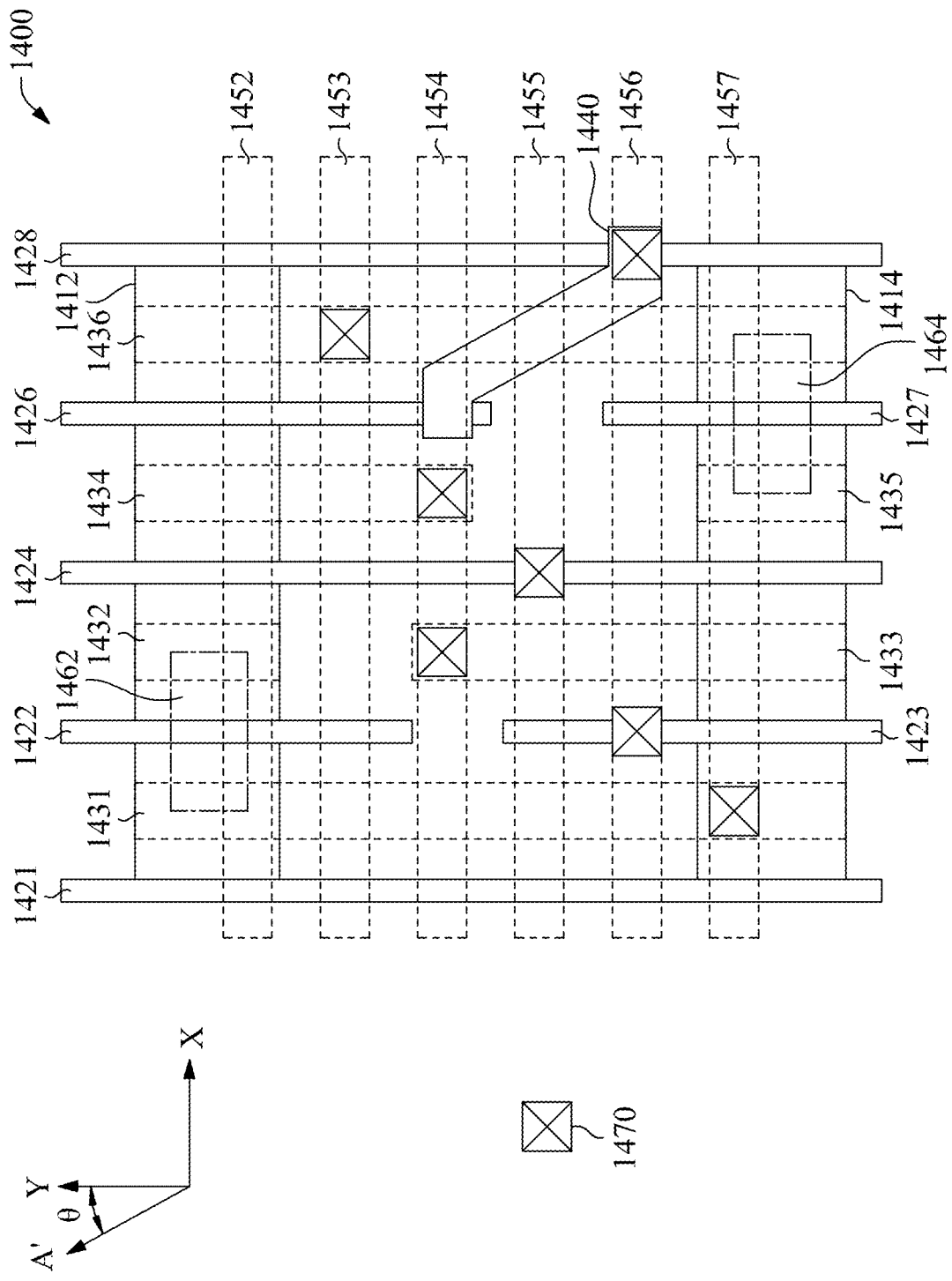

FIG. 14 is a layout diagram of a portion of another example layout design 1400 of the switching circuit of FIG. 7 in accordance with some embodiments.

Layout design 1400 includes a first OD layout pattern 1412; a second OD layout pattern 1414; a set of layout patterns 1421-1428 extending along direction Y for forming corresponding conductive features in a first conductive layer; a set of layout patterns 1431-1436 extending along the direction Y for forming corresponding conductive features in a second conductive layer; a layout pattern 1440 extending along a direction A' for forming a corresponding conductive feature in a third conductive layer between the first conductive layer and the second conductive layer; and a set of layout patterns 1452-1457 extending along direction X for forming corresponding conductive features in a fourth conductive layer over the first, second, and third conductive layers. Layout design 1400 further includes layout patterns 1462 and 1464 corresponding to forming conductive features extending along direction X in a fifth conductive layer between the first and second conductive layers.

The conductive feature fabricated according to layout pattern 1424 is usable as the gate of first P-type transistor 720 and the gate of second N-type transistor 750 in FIG. 7. The conductive feature fabricated according to layout pattern 1423 is usable as the gate of first N-type transistor 730. The conductive feature fabricated according to layout pattern 1426 is usable as the gate of second P-type transistor 740.

The conductive feature fabricated according to layout pattern 1432 and the OD region formed according to layout pattern 1412 are usable to form the S/D terminal 724 of transistor 720. The conductive feature fabricated according to layout pattern 1431 and the OD region formed according to layout pattern 1414 are usable to form the S/D terminal 734 of transistor 730. The conductive feature fabricated according to layout pattern 1462 is usable to electrically connect the conductive features corresponding to layout patterns 1431 and 1432.

The conductive feature fabricated according to layout pattern 1434 and the OD region formed according to layout pattern 1412 are usable to form the S/D terminal 726 of transistor 720 and the S/D terminal 746 of transistor 740. The conductive feature fabricated according to layout pattern 1433 and the OD region formed according to layout pattern 1414 are usable to form the S/D terminal 736 of transistor 730 and the S/D terminal 756 of transistor 750. The conductive features corresponding to layout patterns are electrically connected by the conductive feature corresponding to layout pattern 1454 through via plugs formed based on corresponding via layout patterns 1470.

The conductive feature fabricated according to layout pattern 1435 and the OD region formed according to layout pattern 1414 are usable to form the S/D terminal 754 of transistor 750. The conductive feature fabricated according to layout pattern 1464 is usable to electrically connect the conductive features corresponding to layout patterns 1435 and 1436.

The conductive feature formed according to layout pattern 1440 electrically connects gates fabricated according to layout patterns 1426 and 1423 through one or more intermediate conductive features corresponding to layout patterns 1428 and 1456. Therefore, conductive feature formed according to layout pattern 1440 corresponds to the signal path configured to receive control signal CTRL1 in FIG. 7. Layout pattern 1440 extends along the direction A', and direction A and direction Y have an angle θ' ranging from 20 degrees to 70 degrees. In some embodiments, layout pattern 1440 corresponds to a mirror-image version of layout pattern 322 in FIG. 3E. In some embodiments, layout pattern 1440 is replaced by a layout pattern corresponding to layout pattern 324 in FIG. 3F. In some embodiments, layout pattern 1440 is replaced by a layout pattern corresponding to layout pattern 326 in FIG. 3G.

Layout design 1400 further includes other via layout patterns 1470 corresponding to one or more of via plug layers. The via plugs fabricated based on via layout patterns 1470 and the conductive features fabricated based on layout patterns 1428, 1431-1436, 1440, 1452-1457, 1462, and 1464 together connected the transistor fabricated according to layout patterns 1424, 1426, and 1423 to for a circuit as depicted in Figure An aspect of this description relates to an integrated circuit. The integrated circuit includes a first gate electrode structure extending in a first direction and having a first portion and a second portion separated in the first direction from each other. The integrated circuit further includes a second gate electrode structure extending in the first direction and separated in a second direction from the first gate electrode structure, wherein the second direction is orthogonal to the first direction. The integrated circuit further includes a conductive feature. The conductive feature includes a first section electrically connected to the second portion, wherein the first section extends in the second direction. The conductive feature further includes a second section electrically connected to the second gate electrode structure, wherein the second section extends in the second direction. The conductive feature further includes a third section electrically connecting the first section and the second section, wherein the third section extends in a third direction angled with respect to both the first direction and the second direction. In some embodiments, the first portion is part of a dummy structure. In some embodiments, the integrated circuit further includes a first active region extending in the second direction; and a second active region extending in the second direction, wherein the first active region is separated from the second active region. In some embodiments, the first portion overlaps the second active region, and the second portion overlaps the first active region. In some embodiments, the second gate structure overlaps the first active region and the second active region. In some embodiments, the integrated circuit further includes a third gate electrode structure extending in the first direction, wherein the first gate electrode structure is between the second gate electrode structure and the third gate electrode structure. In some embodiments, the third gate electrode structure overlaps the first active region and the second active region.

An aspect of this description relates to an integrated circuit. The integrated circuit includes a first active region extending in a first direction. The integrated circuit further includes a second active region extending in the first direction. The integrated circuit further includes a first gate electrode structure extending in a second direction perpendicular to the first direction, wherein the first gate electrode structure is part of a first transistor, and the first gate electrode structure is spaced from the first active region. The integrated circuit further includes a second gate electrode structure extending in the second direction, wherein the second gate electrode structure is part of a second transistor, and the second gate electrode structure is spaced from the second active region. The integrated circuit further includes a third gate electrode structure extending in the second direction, wherein the third gate electrode structure is part of a third transistor and a fourth transistor, and the third gate electrode structure is between the first gate electrode structure and the second gate electrode structure. In some embodiments, the integrated circuit further includes a first source/drain (S/D) contact between the first gate electrode structure and the third gate electrode structure. In some embodiments, the first S/D contact is connected to both the third transistor and first transistor. In some embodiments, the first S/D contact overlaps the second active region. In some embodiments, the integrated circuit further includes a second S/D contact on an opposite side of the third gate electrode structure from the first S/D contact, wherein the second S/D contact overlaps the first active region. In some embodiments, the integrated circuit further includes a fourth gate electrode structure extending in the second direction, wherein the second gate electrode structure is between the fourth gate electrode structure and the third gate electrode structure. In some embodiments, the fourth gate electrode structure overlaps the first active region and the second active region. In some embodiments, the integrated circuit further includes a conductive feature, wherein the conductive feature electrically connects the fourth gate electrode structure to the second gate electrode structure. In some embodiments, the conductive feature includes a first section electrically connected to the second gate electrode structure, wherein the first section extends in the first direction, a second section electrically connected to the fourth gate electrode structure, wherein the second section extends in the first direction, and a third section electrically connecting the first section and the second section, wherein the third section extends in a third direction angled with respect to both the first direction and the second direction.

An aspect of this description relates to an integrated circuit. The integrated circuit includes a first active region extending in a first direction. The integrated circuit further includes a second active region extending in the first direction. The integrated circuit further includes a first gate electrode structure extending in a second direction perpendicular to the first direction, wherein a first portion of the first gate electrode structure overlaps the second active region and is part of a first transistor, and a second portion of the first gate electrode structure overlaps the first active region and is a first dummy structure. The integrated circuit further includes a second gate electrode structure extending in the second direction, wherein a third portion of the second gate electrode structure overlaps the first active region and is part of a second transistor, and a fourth portion of the second gate electrode structure overlaps the second region and is a second dummy structure. The integrated circuit further includes a third gate electrode structure extending in the second direction, wherein the third gate electrode structure is part of a third transistor and a fourth transistor, and the third gate electrode structure is between the first gate electrode structure and the second gate electrode structure. In some embodiments, the integrated circuit further includes a fourth gate electrode structure extending in the second direction, wherein the second gate electrode structure is between the fourth gate electrode structure and the third gate electrode structure. In some embodiments, the integrated circuit further includes a conductive feature, wherein the conductive feature electrically connects the fourth gate electrode structure to the second gate electrode structure. In some embodiments, the conductive feature includes a first section electrically connected to the second gate electrode structure, wherein the first section extends in the first direction, a second section electrically connected to the fourth gate electrode structure, wherein the second section extends in the first direction, and a third section electrically connecting the first section and the second section, wherein the third section extends in a third direction angled with respect to both the first direction and the second direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
   a first gate electrode structure extending in a first direction and having a first portion and a second portion separated in the first direction from each other;
   a second gate electrode structure extending in the first direction and separated in a second direction from the first gate electrode structure, wherein the second direction is orthogonal to the first direction; and
   a conductive feature, wherein the conductive feature comprises:
      a first section electrically connected to the second portion, wherein the first section extends in the second direction,
      a second section electrically connected to the second gate electrode structure, wherein the second section extends in the second direction, and
      a third section electrically connecting the first section and the second section, wherein the third section extends in a third direction angled with respect to both the first direction and the second direction.

2. The integrated circuit of claim 1, wherein the first portion is part of a dummy structure.

3. The integrated circuit of claim 1, further comprising:
   a first active region extending in the second direction; and
   a second active region extending in the second direction, wherein the first active region is separated from the second active region.

4. The integrated circuit of claim 3, wherein the first portion overlaps the second active region, and the second portion overlaps the first active region.

5. The integrated circuit of claim 3, wherein the second gate structure overlaps the first active region and the second active region.

6. The integrated circuit of claim 3, further comprising a third gate electrode structure extending in the first direction, wherein the first gate electrode structure is between the second gate electrode structure and the third gate electrode structure.

7. The integrated circuit of claim 6, wherein the third gate electrode structure overlaps the first active region and the second active region.

8. An integrated circuit, comprising:
a first active region extending in a first direction;
a second active region extending in the first direction;
a first gate electrode structure extending in a second direction perpendicular to the first direction, wherein the first gate electrode structure is part of a first transistor, and the first gate electrode structure is spaced from the first active region;
a second gate electrode structure extending in the second direction, wherein the second gate electrode structure is part of a second transistor, and the second gate electrode structure is spaced from the second active region; and
a third gate electrode structure extending in the second direction, wherein the third gate electrode structure is part of a third transistor and a fourth transistor, and the third gate electrode structure is between the first gate electrode structure and the second gate electrode structure.

9. The integrated circuit of claim 8, further comprising a first source/drain (S/D) contact between the first gate electrode structure and the third gate electrode structure.

10. The integrated circuit of claim 9, wherein the first S/D contact is connected to both the third transistor and first transistor.

11. The integrated circuit of claim 9, wherein the first S/D contact overlaps the second active region.

12. The integrated circuit of claim 11, further comprising a second S/D contact on an opposite side of the third gate electrode structure from the first S/D contact, wherein the second S/D contact overlaps the first active region.

13. The integrated circuit of claim 8, further comprising a fourth gate electrode structure extending in the second direction, wherein the second gate electrode structure is between the fourth gate electrode structure and the third gate electrode structure.

14. The integrated circuit of claim 13, wherein the fourth gate electrode structure overlaps the first active region and the second active region.

15. The integrated circuit of claim 13, further comprising a conductive feature, wherein the conductive feature electrically connects the fourth gate electrode structure to the second gate electrode structure.

16. The integrated circuit of claim 15, wherein the conductive feature comprises:
a first section electrically connected to the second gate electrode structure, wherein the first section extends in the first direction,
a second section electrically connected to the fourth gate electrode structure, wherein the second section extends in the first direction, and
a third section electrically connecting the first section and the second section, wherein the third section extends in a third direction angled with respect to both the first direction and the second direction.

17. An integrated circuit, comprising:
a first active region extending in a first direction;
a second active region extending in the first direction;
a first gate electrode structure extending in a second direction perpendicular to the first direction, wherein a first portion of the first gate electrode structure overlaps the second active region and is part of a first transistor, and a second portion of the first gate electrode structure overlaps the first active region and is a first dummy structure;
a second gate electrode structure extending in the second direction, wherein a third portion of the second gate electrode structure overlaps the first active region and is part of a second transistor, and a fourth portion of the second gate electrode structure overlaps the second region and is a second dummy structure; and
a third gate electrode structure extending in the second direction, wherein the third gate electrode structure is part of a third transistor and a fourth transistor, and the third gate electrode structure is between the first gate electrode structure and the second gate electrode structure.

18. The integrated circuit of claim 17, further comprising a fourth gate electrode structure extending in the second direction, wherein the second gate electrode structure is between the fourth gate electrode structure and the third gate electrode structure.

19. The integrated circuit of claim 18, further comprising a conductive feature, wherein the conductive feature electrically connects the fourth gate electrode structure to the second gate electrode structure.

20. The integrated circuit of claim 19, wherein the conductive feature comprises:
a first section electrically connected to the second gate electrode structure, wherein the first section extends in the first direction,
a second section electrically connected to the fourth gate electrode structure, wherein the second section extends in the first direction, and
a third section electrically connecting the first section and the second section, wherein the third section extends in a third direction angled with respect to both the first direction and the second direction.

* * * * *